(12) United States Patent
Belov et al.

(10) Patent No.: US 11,895,114 B2
(45) Date of Patent: *Feb. 6, 2024

(54) AUTHENTICATING AND CREATING ACCOUNTS ON BEHALF OF ANOTHER USER

(71) Applicant: Apple Inc., Cupertino, CA (US)

(72) Inventors: Dmitry V. Belov, Santa Clara, CA (US); Justin K. Bennett, Ilion, NY (US); David S. Clark, San Jose, CA (US); Kalyan C. Gopavarapu, Sunnyvale, CA (US); David G. Knipp, San Jose, CA (US); Robert F. Lee, Fremont, CA (US); Sudhakar N. Mambakkam, San Jose, CA (US); Nagarjuna Thottempudi, Fremont, CA (US); Tyler D. Hawkins, San Jose, CA (US); Reed E. Olsen, San Jose, CA (US); Paul W. Salzman, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,457

(22) Filed: Nov. 28, 2022

(65) Prior Publication Data

US 2023/0088498 A1 Mar. 23, 2023

Related U.S. Application Data

(62) Division of application No. 16/865,014, filed on May 1, 2020, now Pat. No. 11,528,271.

(Continued)

(51) Int. Cl.
*H04L 9/40* (2022.01)
*H04M 1/72412* (2021.01)

(52) U.S. Cl.
CPC ...... *H04L 63/0884* (2013.01); *H04L 63/0823* (2013.01); *H04L 63/0869* (2013.01); *H04M 1/72412* (2021.01)

(58) Field of Classification Search
CPC ............ H04L 63/0884; H04L 63/0823; H04L 63/0869; H04L 63/061; H04L 67/1095;
(Continued)

(56) References Cited

U.S. PATENT DOCUMENTS

| | | | |
|---|---|---|---|
| 6,839,841 | B1 | 1/2005 | Medvinsky et al. |
| 7,774,708 | B2 | 8/2010 | Bell et al. |

(Continued)

FOREIGN PATENT DOCUMENTS

| | | |
|---|---|---|
| EP | 3128392 A1 | 2/2017 |
| WO | 2020227133 A1 | 11/2020 |

OTHER PUBLICATIONS

Armani Exchange Launches First Ever Connected Wearables Line With New Hybrid Smartwatch Collection, PR Newswire, Jan. 4, 2017, 2 pages.

(Continued)

*Primary Examiner* — Huan V Doan
(74) *Attorney, Agent, or Firm* — Kilpatrick Townsend & Stockton LLP

(57) ABSTRACT

Embodiments described herein provide for a satellite device that can be associated with a user account of a minor aged (e.g., child or adolescent) user that does not have a smartphone that can be used as a companion device to the satellite device. The satellite device can be configured to be used as a primary device, without reliance upon a paired smartphone. Certain information can be synchronized with the satellite device via the association with the family account. During initial configuration, a set of cryptographic keys can be generated to associate the account of the satellite device (Continued)

with the set of accounts in the family. The satellite device can then access calendars, media, or other data that is shared with user accounts within a family of user accounts.

24 Claims, 30 Drawing Sheets

Related U.S. Application Data

(60) Provisional application No. 62/856,010, filed on Jun. 1, 2019, provisional application No. 62/843,833, filed on May 6, 2019.

(58) Field of Classification Search
CPC .. H04L 63/083; H04L 67/34; H04M 1/72412; H04W 12/047; H04W 12/50; H04W 12/71; H04W 12/76; H04W 12/06
See application file for complete search history.

(56) References Cited

U.S. PATENT DOCUMENTS

| | | |
|---|---|---|
| 8,161,411 B2 | 4/2012 | Robbin et al. |
| 9,124,637 B2 | 9/2015 | Brouwer et al. |
| 9,173,115 B2 | 10/2015 | Sundareswaran et al. |
| 9,326,091 B2 * | 4/2016 | Donnellan ............... H04W 4/80 |
| 9,471,697 B2 | 10/2016 | Lortz et al. |
| 9,473,509 B2 | 10/2016 | Arsanjani et al. |
| 9,530,027 B2 | 12/2016 | Shahidzadeh et al. |
| 9,612,862 B2 | 4/2017 | Faaborg et al. |
| 9,665,357 B2 | 5/2017 | Nigam |
| 9,763,097 B2 | 9/2017 | Robinson et al. |
| 9,830,170 B2 | 11/2017 | Mun et al. |
| 9,838,526 B2 | 12/2017 | Donley et al. |
| 9,842,062 B2 | 12/2017 | Ford et al. |
| 9,955,286 B2 | 4/2018 | Segal |
| 10,078,748 B2 | 9/2018 | Mehta et al. |
| 10,095,500 B2 | 10/2018 | Pollack et al. |
| 10,122,723 B1 | 11/2018 | Chang et al. |
| 10,811,140 B2 | 10/2020 | Toumazou et al. |
| 10,867,606 B2 | 12/2020 | Li et al. |
| 10,885,510 B2 | 1/2021 | Yarbrough et al. |
| 11,062,807 B1 | 7/2021 | Ross et al. |
| 11,176,539 B2 | 11/2021 | Mohamed |
| 11,528,271 B2 | 12/2022 | Belov et al. |
| 2002/0049806 A1 | 4/2002 | Gatz et al. |
| 2012/0210246 A1 | 8/2012 | Bylehn et al. |
| 2013/0086232 A1 * | 4/2013 | Hwang ................... H04W 4/00 709/221 |
| 2014/0337621 A1 | 11/2014 | Nakhimov |
| 2015/0242837 A1 | 8/2015 | Yarbrough et al. |
| 2015/0264722 A1 | 9/2015 | Cheng et al. |
| 2015/0348032 A1 | 12/2015 | Ioveva et al. |
| 2016/0062572 A1 | 3/2016 | Yang et al. |
| 2016/0070439 A1 | 3/2016 | Bostick et al. |
| 2016/0078571 A1 | 3/2016 | Singh |
| 2016/0224810 A1 | 8/2016 | Shahidzadeh et al. |
| 2016/0262094 A1 | 9/2016 | Khay-Ibbat et al. |
| 2016/0337863 A1 | 11/2016 | Robinson et al. |
| 2017/0140146 A1 | 5/2017 | Mehta et al. |
| 2017/0278365 A1 | 9/2017 | Madar et al. |
| 2017/0357967 A1 | 12/2017 | Sykora et al. |
| 2018/0069871 A1 | 3/2018 | Fasoli et al. |
| 2018/0165936 A1 | 6/2018 | Smith et al. |
| 2018/0176968 A1 | 6/2018 | Reunamaki et al. |
| 2018/0342176 A1 | 11/2018 | Californiaa |
| 2019/0050218 A1 | 2/2019 | Giatilis et al. |
| 2019/0138145 A1 | 5/2019 | Brisimitzakis et al. |
| 2019/0279637 A1 | 9/2019 | Li et al. |
| 2019/0325495 A1 | 10/2019 | Stark |
| 2020/0151707 A1 | 5/2020 | Mohamed |
| 2020/0151827 A1 | 5/2020 | Carver et al. |
| 2020/0303076 A1 | 9/2020 | Toumazou et al. |
| 2020/0359204 A1 | 11/2020 | Hawkins et al. |

OTHER PUBLICATIONS

U.S. Appl. No. 16/864,997, Non-Final Office Action, dated Aug. 18, Apr. 2022, 14 pages.
U.S. Appl. No. 16/882,128, Non-Final Office Action, dated Sep. 29, 2022, 27 pages.
C Spire Launches Samsung Galaxy S(R) on Its Network, Business Wire, Apr. 17, 2013, 2 pages.
Weckler et al., Samsung Hoping Hi-Tech Watches Make Market Tick, Irish Independent, Feb. 23, 2014, 4 pages.
U.S. Appl. No. 16/865,014, Notice of Allowance, dated Aug. 4, 2022, 11 pages.
Owens, Using a Cellular Apple Watch as Your Kid's Cell Phone, Available Online at: https://geekdad.com/2018/07/using-a-cellular-apple-watch-as-your-kids-cell-phone/, Jul. 19, 2018, 27 pages.
International Patent Application No. PCT/US2020/031136, International Search Report and Written Opinion, dated Oct. 30, 2020, 22 pages.

* cited by examiner

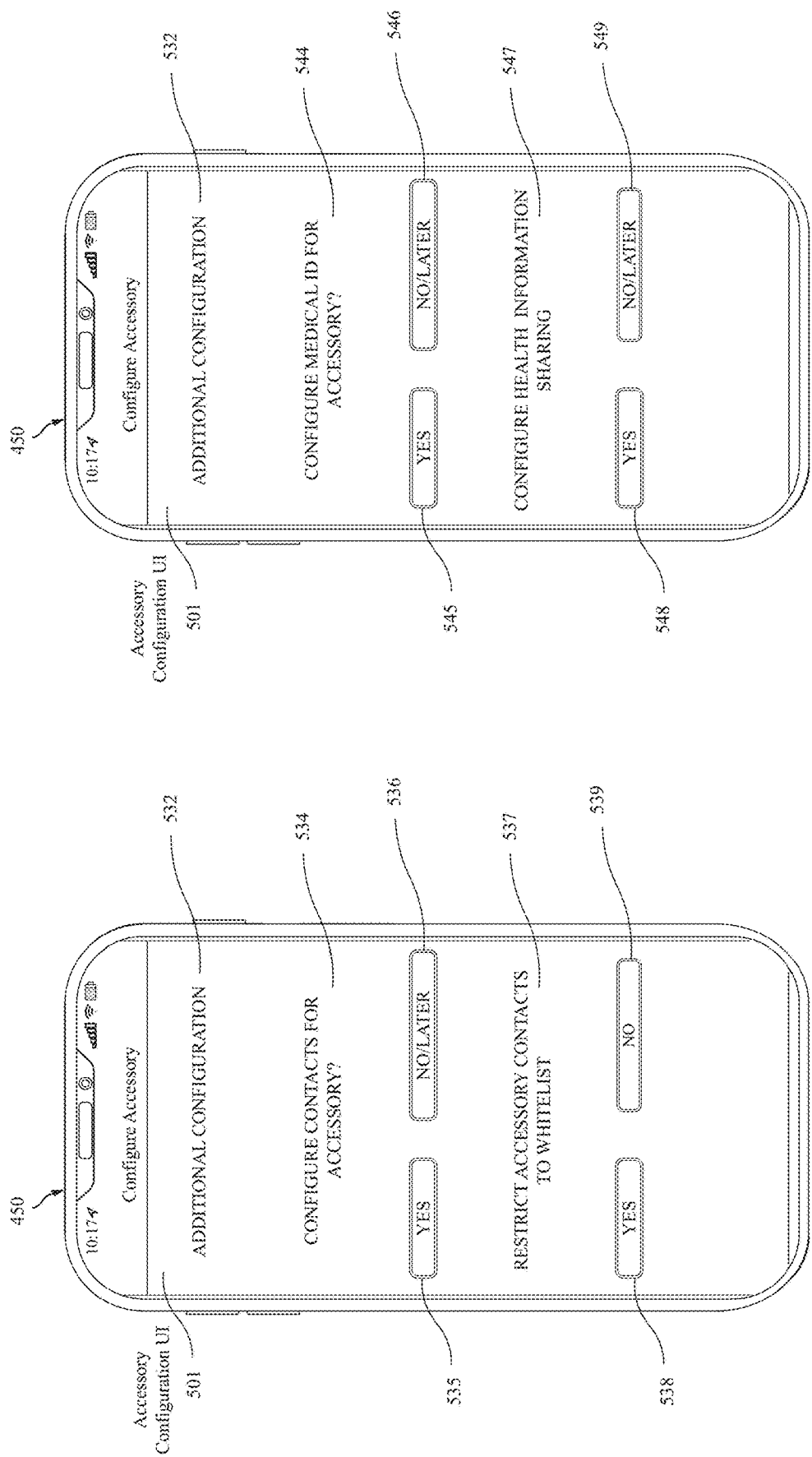

AUTHENTICATING AND CREATING ACCOUNTS ON BEHALF OF ANOTHER USER

CROSS-REFERENCE

This application is a divisional of U.S. patent application Ser. No. 16/865,014, filed May 1, 2020, which claims priority to U.S. Provisional Patent Application No. 62/843,833, filed on May 6, 2019, and U.S. Provisional Patent Application No. 62/856,010, filed on Jun. 1, 2019, the entire contents of each is hereby incorporated herein by reference.

BACKGROUND OF THE DISCLOSURE

In addition to keeping time, users may desire wearable electronic devices to be able to perform a variety of other operations including running software applications. A user may wish to access different types of information, such as various aspects related to keeping time, or different application data points, in different contexts. Generally, wearable electronic devices are associated or paired with a companion device, through which many operational details of the wearable device may be configured.

SUMMARY OF THE DESCRIPTION

Embodiments described herein provide for a satellite device that can be associated with a user account of a minor aged (e.g., child or adolescent) user that does not have a smartphone that can be used as a companion device to the satellite device. The satellite device can be configured to be used as a primary device, without reliance upon a paired smartphone. Certain information can be synchronized with the satellite device via the association with the family account. During initial configuration, a set of cryptographic keys can be generated to associate the account of the satellite device with the set of accounts in the family. The satellite device can then access calendars, media, or other data that is shared with user accounts within a family of user accounts. Where a child user does not have an account to associated with the satellite device, a parent user can create an account on behalf of the child user.

Other embodiments described herein provide for a satellite device that can be a managed enterprise device associated with a managed enterprise account. Certain information can be synchronized with the satellite device via the association with a group of enterprise accounts. For example, the satellite device can then access calendars, media, or other data that is shared with user accounts within a group of enterprise user accounts. The satellite device can also support enterprise account creation by a management device on behalf of an employee or another enterprise user.

One embodiment provides a non-transitory machine-readable medium storing instructions to cause one or more processors of an electronic device to perform operations comprising establishing a wireless data connection between the electronic device and a wireless accessory, displaying a prompt for authentication credentials associated with a first account, wherein the first account is to be associated with the wireless accessory and the first account differs from a second account, the second account associated with the electronic device, transmitting authentication credentials for the first account to a first server, receiving an authentication response from the first server, wherein the authentication response indicates that the wireless accessory is trusted by the first server, and sending credentials to the wireless accessory to enable the wireless accessory to authenticate with a second server using the first account.

One embodiment provides an electronic device comprising a first wireless network interface, a second wireless network interface, a touch-screen display, and one or more processors to execute instructions stored in memory. The instructions to cause the one or more processors to establish a first data connection with an external electronic device via the first wireless network interface, display, via the touch-screen display, a prompt to request input of a passcode for the electronic device, store a received passcode within memory of the electronic device, and receive, via the first data connection, credentials for an account to associate with the electronic device, the credentials received via a user interface presented on the external electronic device. The one or more processors can additionally establish a second data connection with a server device via the second wireless network interface, authenticate with the server device via the credentials for the account, and after authentication with the server device via the credentials for the account, configure the electronic device to authenticate with the server device via the passcode stored within the memory of the electronic device.

One embodiment provides for a non-transitory machine readable medium storing instructions to cause one or more processors of a mobile electronic device to perform operations of a system, method, or mobile electronic device as described herein. Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which:

FIG. 4A-4C show exemplary instruction screens to enable setup of a wearable device;

FIG. 5A-5D illustrate user interfaces to configure an accessory device as a satellite accessory;

DETAILED DESCRIPTION

Figure 1B:
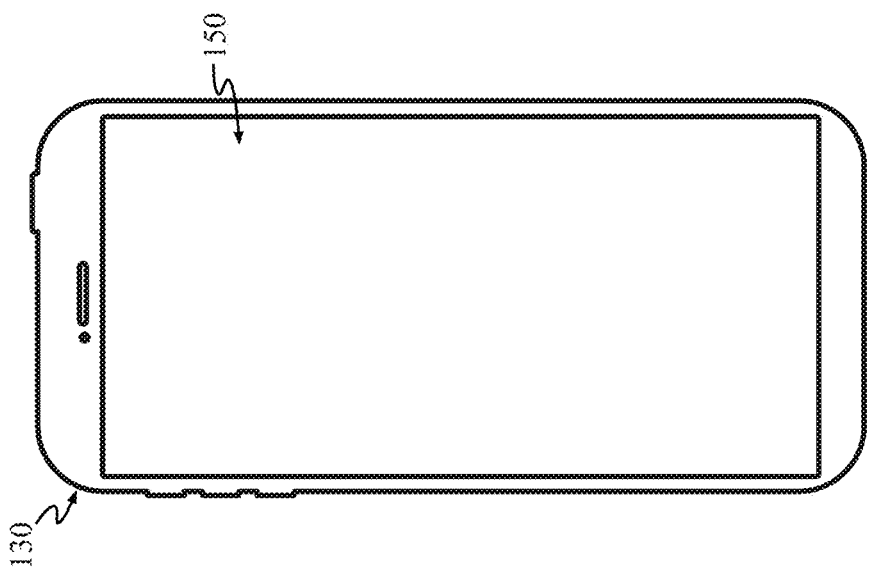
FIG. 1A-1B illustrates a wearable electronic device and a companion mobile electronic device, according to embodiments described herein.

While, wearable electronic devices are generally associated or paired with a companion device, embodiments described herein provide a wearable electronic device that can be operated without an associated companion device. In this context, a companion device is an electronic device that is connected to, paired with, or associated with a wearable electronic device. The companion device may be in continuous or periodic communication with the wearable electronic device and can perform computing operations in concert with or on behalf of the wearable device. For example, a smartphone or tablet computing device may be a companion device to a wearable electronic device, such as, but not limited to, a smartwatch device. During initial configuration of the wearable device, the device can be designated as a standalone wearable device that is not to be in persistent communication with the companion device that is being used to configure the wearable device. In one embodiment, a variant of a standalone wearable device can be configured to work in concert with an electronic device that does not include all of the functionality necessary to be configured as a conventional companion device. For example, a standalone wearable device can be configured to work in concert with a smartphone from a different vendor or manufacturer than the wearable device.

In one embodiment, the standalone wearable device can be associated with a user or user account that is different from the account associated with the user that is configuring the wearable device. The wearable electronic device can have an interface that includes an internal display device and a touch input interface. The touch input interface can be configured to allow the wearable device to act as a primary device. Functionality that previously would be configured via a companion application on a paired companion device can be performed directly on the interface of the wearable device.

In some embodiments the standalone wearable device is configured as a satellite device that is associated with an account that is in a family or group of user accounts. For example, a satellite device can be associated with an account of a minor aged (e.g., child or adolescent) member of a family that does not have a smartphone that can be used as a companion device to the satellite device. The satellite device may also be configured for use by an older adult within the same family. In another example, a satellite device can be managed device of an employee, with some functionality associated with an enterprise management account. The satellite device can be configured to be used as a primary device, without reliance upon a paired smartphone. Accordingly, the satellite device may also be configured for an adult user that does not have an associated compatible companion device or does not wish to use the satellite device with a companion device. Certain information can be synchronized with the satellite device via the association with the family or enterprise account. During initial configuration, a set of cryptographic keys can be generated to associate the account of the satellite device with the set of accounts in the family or enterprise group.

The satellite device can access calendars, media, or other data that is shared with the family or group of user accounts. A user having a family account that is configured as a parent (or guardian) account can push calendar or contact information to the satellite device via a server-based link between the guardian account and the account associated with the satellite device. In one embodiment the satellite device can access calendars, media, or other data associated with a set of enterprise accounts. A management account can be configured that pushes or shared calendar, media, or other data to employees within a group of accounts.

The techniques described herein can be applied to a variety of wearable devices, including watches, GPS trackers, fitness trackers, glasses (e.g., virtual reality, mixed reality, and/or augmented reality head mounted displays), jewelry, shoes, clothes, or other wearable items, heart monitors, health sensors, glucose monitors, audio accessories (e.g., headphones or earphones) and other accessories that can worn by a user. In one embodiment, the techniques described herein can be applied to non-wearable connected devices, such as connected speaker devices. Thus, even though the portions of the following description use smartwatches as example wearable devices, embodiments provide techniques that can apply to other types of accessories or devices.

Software versions in use on the satellite watch can be kept up to date or synchronized with the device associated with the guardian account. For example, when a guardian account approves a set of terms and conditions associated with an end-use license agreement for operating system software, the agreement can also be applied to the satellite device and the satellite device can be automatically updated to software versions for which the agreed-to terms and condition apply. A management account associated with an enterprise satellite device can also approve terms and conditions for the satellite device. Software updates for satellite device can also be limited to those versions of the software that are compatible with the software version on the device associated with the guardian or management account. Compatible versions are those versions that will not break the communication link between the device of the guardian or management account and the satellite device.

When a wearable accessory, such as a smartwatch, is paired with a companion device, the wearable accessory can rely upon the smartwatch to perform a significant amount of communication to remote devices and servers on behalf of the smartwatch. Data can then be relayed to the smartwatch via a low energy wireless connection. When a wearable accessory device is acting as a standalone or a satellite device, the accessory can act as a primary device and maintain network connections to remote servers on its own via, for example, a Wi-Fi or cellular connection.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

Exemplary Wearable Electronic Device

Figure 1A:
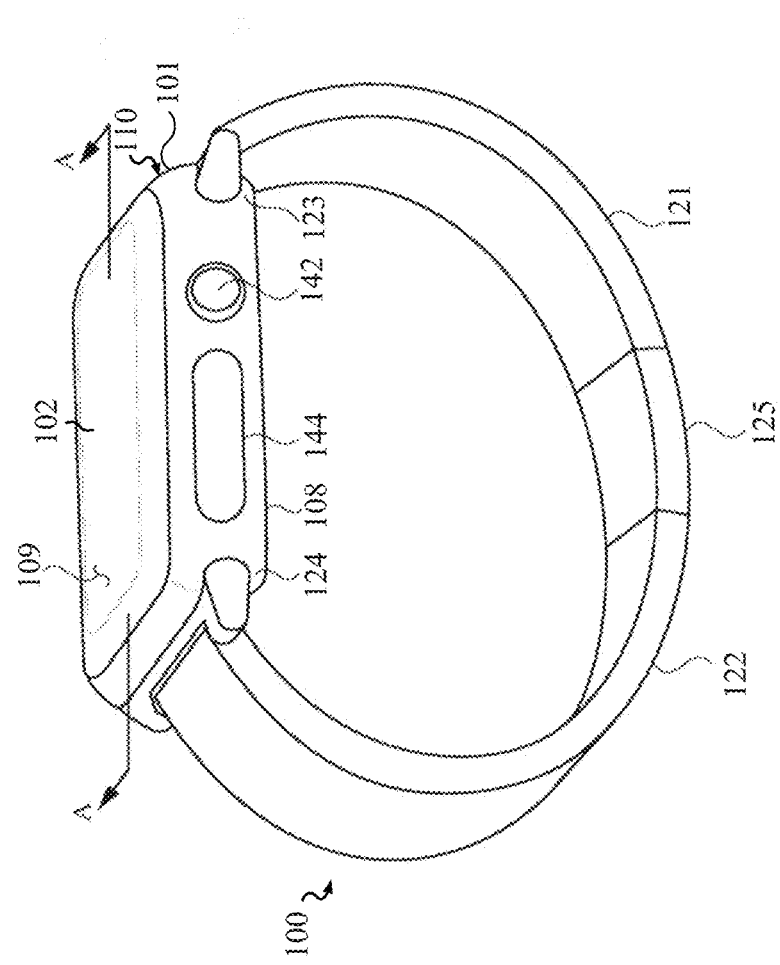

FIG. 1A-1B illustrates a wearable electronic device and a companion mobile electronic device, according to embodiments described herein. FIG. 1A illustrates a wearable electronic device in the form of a wristwatch device. FIG. 1B illustrates an exemplary mobile electronic device in the form of a smartphone device. Although specific examples are shown, embodiments described herein are applicable to additional electronic devices. For example, exemplary wearable electronic devices include various forms of time keeping devices, electronic or computerized glasses, sports related devices, pedometers, and or health and medical devices. Exemplary mobile electronic devices include tablet computers, navigation devices, and may also include laptop computers.

As shown in FIG. 1A, one embodiment provides a wearable electronic device 100 that includes a device body 110 that can be attached to a wrist of a user using a band assembly. The exterior surface of the device body 110 is defined, in part, by the exterior surface of a housing 101 and the exterior surface of a cover 109. The device body 110 is substantially rectangular with round or curved side portions, although other shapes and/or designs can be implemented. The outer surfaces of the cover 109 and the housing 101 coincide at a joint interface and cooperate to form a continuous contoured surface. The continuous contoured surface may have a constant radius and may be tangent to a flat middle portion of the cover 109 and/or a flat bottom portion of the housing 101. In some embodiments, the cover 109 has substantially the same shape as a flat bottom portion and at least a portion of the curved side portions of the housing 101. The housing 101 may be formed from a variety of materials, including, without limitation plastic, glass, ceramics, fiber composites, metal (e.g., stainless steel, aluminum, magnesium), other suitable materials, or a combination of these materials. Further, the housing 101 may include a surface treatment or coating, which may be formed from a variety of materials, including, without limitation aluminum, steel, gold, silver and other metals, metal alloys, ceramics, wood, plastics, glasses, and the like.

The illustrated wearable electronic device 100 may be referred to herein as a wearable device, a device, an electronic wristwatch, or an electronic watch. While these terms may be used with respect to certain embodiments, the functionality provided by the illustrated electronic wearable device 100 may be substantially greater than or vary with respect to many traditional electronic watches or timekeeping devices. For example, the techniques described herein are applicable to any wearable device. In addition to smart watch devices, a wearable device described herein can be or include GPS trackers, fitness trackers, glasses (e.g., virtual reality, mixed reality, and/or augmented reality head mounted displays), jewelry, shoes, clothes, or other wearable items, heart monitors, health sensors, glucose monitors, audio accessories (e.g., headphones or earphones) and other accessories that can worn by a user. Thus, even though the portions of the following description use smartwatches as example wearable devices, embodiments provide techniques that can apply to other types of accessories.

The wearable electronic device 100 includes a display 102 that is disposed at least partially within an opening or cavity defined within a top portion of the housing 101 of the device body 110. The display may be formed from a liquid crystal display (LCD), organic light emitting diode (OLED) display, organic electroluminescence (OEL) display, or other type of display device. The display 102 may be used to present visual information to the user and may be operated in accordance with one or more display modes or the software applications being executed on the device 100. By way of example, the display may be configured to present the current time and date similar to a traditional watch or timepiece. The display may also present a variety of other visual information that may correspond to or be produced using one of the other modules in the wearable electronic device 100. For example, the display 102 may be configured to display one of a variety of notification messages, which can be generated based on data received from the one or more sensors, the wireless communication system, or other subsystem of the wearable electronic device 100. The display 102 may also be configured to present visual information or data that is based on the output of one or more sensor outputs. The display 102 can also provide status or information related to a wireless charging process or battery power. The display 102 can also present visual output or information related to media being produced using a speaker or acoustic module of the wearable electronic device 100. Accordingly, a variety of other types of visual output or information may be presented using the display.

In the current example, the display 102 includes or is integrated with a cover 109 that helps to protect the display from physical impact or scratches. In the field of wearable devices, the cover 109 may also be referred to generically as a crystal or cover glass, regardless of the material that is used to form the cover 109. In some cases, the cover 109 is formed from a sheet or block of sapphire material. Sapphire may provide superior optical and surface hardness properties as compared to other materials. In some cases, the sapphire material has a hardness of approximately 9 on the Mohs scale. In alternative embodiments, the cover 109 is formed from a glass, polycarbonate, or other optically transparent material. The cover 109 may also be coated with one or more optical or mechanical enhancing materials or surface treatments. For example, interior and/or exterior surfaces of the cover 109 may be coated with an anti-reflective (AR), oleophobic or other coating to enhance the visible or functional properties of the display. In some cases, the cover 109 may be configured to cooperate with an antenna used to facilitate wireless communication with an external device.

The cover 109 is formed from a transparent or semi-transparent material and, when assembled has an external surface and an internal surface. The cover 109 is disposed above the display and encloses a cavity or opening formed in the top portion of the housing 101. In some embodiments, the external surface of the cover 109 cooperates with the external surface of the housing to form a substantially continuous external peripheral surface of the electronic device. The external surface of the cover 109 has a flat middle portion at the center of the cover, which extends outwardly. The cover 109 can also include a curved edge portion that emanates from and surrounds the flat middle portion and extends outwardly to an edge at the side of the cover 109. In some embodiments, the cover 109 also includes an opaque mask disposed relative to the internal surface of the transparent cover. The opaque mask may correspond to or otherwise define the viewable area of the display 102. The mask may have an outer boundary that is located proximate the edge of the side of the cover 109 and has an inner boundary located within the curved edge portion of the cover 109.

In some instances, the cover 109 is disposed relative to a touch sensor, which may be integrated with the display 102 or other element of the wearable electronic device 100. The touch sensor can be formed from one or more capacitive sensor electrodes or nodes that are configured to detect the presence and/or location of an object or the user's finger that is touching or nearly touching the surface of the display. In some cases, the touch sensor includes an array of sensing nodes formed in accordance with a mutual capacitance sensing scheme. Alternatively or additionally, the touch sensor may include one or more self-capacitive nodes or electrodes that are configured to detect a discharge of electrical current or charge when an object, such as a user's finger, contacts or nearly contacts a surface of the housing 101 or other surface of the wearable electronic device 100. Other types of electronically sensing nodes, including resistive, inductive, or the like, may also be integrated into a surface of the wearable electronic device 100.

In some embodiments, the wearable electronic device 100 may also include a force sensor. The force sensor may be disposed relative to the display 102 or integrated with other elements of the wearable electronic device 100. In some cases, the force sensor includes one or more force sensing structures or force-sensing nodes for detecting and measuring the magnitude of a force or pressure due to a touch on a surface of the wearable electronic device 100. The force sensor may be formed from or implement one or more types of sensor configurations. For example, capacitive and/or strain based sensor configurations may be used alone or in combination to detect and measure the magnitude of a force or pressure due to a touch. As described in more detail below, a capacitive force sensor may be configured to detect the magnitude of a touch based on the displacement of a surface or element on the device. Additionally or alternatively, a strain-based force sensor may be configured to detect the magnitude of a touch based on the deflection.

As discussed above, the display, the touch sensor, and force sensor may be disposed within the housing 101. In this example, one or more buttons 144 and a crown 142 used to receive user input may also be disposed within or relative to the housing 101. Other types of user input, including for example, one or more dials, slides, or similar user input devices or mechanisms may also be disposed within or relative to the housing 101. The housing 101 can include various features for attaching and mounting the subassemblies and modules of the device 100. In particular, the housing 101 may have one or more openings for receiving the cover 109, the display, the force sensor, or other components. The housing 101 may also include one or more holes or openings for receiving the button 144 and crown 142 that are located around the perimeter of the wearable electronic device 100. In some embodiments, the housing 101 also includes internal features, such as bosses and threaded portions, that can be used to attach modules or components within the housing 101.

The wearable electronic device 100 may also include an ambient light sensor (ALS) that is configured to detect and measure changes in ambient lighting conditions. The ALS may include a photodiode and one or more optical elements or lenses for collecting light. An ALS may be located on an external facing surface that is less likely to be blocked when the device is worn or in use. The ALS may be used to adjust settings, including screen brightness and other visual output depending on the overall lighting conditions.

The housing 101 may also include one or more motion-sensing elements or devices for detecting motion of the wearable electronic device 100. For example, the wearable electronic device 100 may include one or more accelerometers that are configured to sense acceleration or changes in motion. Additionally or alternatively, the wearable electronic device 100 may include one or more gyroscopic sensors that are configured to detect changes in direction. In some cases, the one or more gyroscopic sensors may include a spinning mass that can be used to detect changes in angular velocity. Multiple motion-sensing elements may be used to detect motion along multiple directions or axes. The motion sensors may also be used to identify motion gestures. For example, the motion sensors can be used to detect an arm raise or the position of a user's body (within a predetermined confidence level of certainty). The one or more motion-sensing elements may be used to determine an orientation of the device relative to a known or fixed datum. For example, the device may include a compass and/or global positioning system (GPS) that can be used to identify an absolute position. The one or more motion sensing elements may then measure deviation or movement with respect to the absolute position to track movement of the device or the user wearing the device. In some implementations, the one or more motion-sensing elements are used to detect gross movement of the device or user. The gross movement may be used as a pedometer or activity meter, which may be tracked over time and used to calculate a health metric or other health-related information.

The housing 101 may also include one or more openings or orifices coupled to an acoustic module or speaker, which may include a speaker and/or a microphone subassembly. Although the housing 101 may include one or more openings or orifices, the housing 101 may still be substantially waterproof/water resistant and may be substantially impermeable to liquids. For example, the opening or orifice in the housing or enclosure may include a membrane or mesh that is substantially impermeable to liquid ingress. Additionally or alternatively, the geometry of the opening or orifice and other internal features of the housing 101 may be configured to reduce or impede the ingress of liquid or moisture into the device 100. In one example, the opening is formed from one or more orifices that are offset with respect to an internal acoustic chamber or cavity, which may prevent a direct path from the outside of the housing 101 into the acoustic module.

The wearable electronic device 100 includes a device body 110 that may be attached to a user's wrist using a band. In the present example, the band can include a first band strap 121 attached to a first receiving feature 123 and a second band strap 122 attached to a second receiving feature 124. In some embodiments, the first and second band straps 121, 122 include a lug feature that is configured to attach to the first and second receiving features 123, 124, respectively. The free ends of the band straps 121, 122 may be connected with a clasp 125.

The band straps 121, 122 are formed from a flexible or compliant material that may be specially configured for a particular application. The band straps 121, 122 may be formed from a variety of materials, including, for example, leather, woven textiles, or metallic mesh materials. The material and construction of the band straps 121, 122 may depend on the application. For example, the band straps 121, 122 may be formed from a woven textile material configured for exposure to impact and moisture typically associated with outdoor activities. In another example, the band straps 121, 122 may be formed from a metallic mesh material that may be configured to have a fine finish and construction that may be more appropriate for professional or social activities.

Similarly, the clasp 125 may be configured for a particular application or to work with a particular style of band. For example, if the band straps 121, 122 are formed from a metallic mesh material, the clasp 125 may include a magnetic clasp mechanism. In the present example, the device 100 is configured to be attached to the wrist of a user. However, in alternative embodiments, the device may be configured to be attached to the arm, leg or other body part of the user.

The housing 101 includes one or more features for attaching the band straps 121, 122. In the present example, the housing 101 includes a first receiving feature 123 and a second receiving feature 124 for attaching the first band strap 121 and the second band strap 122, respectively. In this example, the band straps 121, 122 include a lug portion that is adapted to mechanically engage with the receiving features 123, 124. The first receiving feature 123 and second receiving feature 124 may be integrally formed into the housing 101. In alternative embodiments, the receiving features may be formed from separate parts and may be attached to the housing 101 during manufacturing. In some embodiments, the receiving features 123, 124 may be configured to release the band straps 121, 122 from the device body 110 (e.g., the housing 101). For example, one or both of the receiving features 123, 124 may include a button or slide, which may be actuated by the user to release a corresponding band strap 121 and 122. One advantage of a releasable lug is that the user can swap between a variety of bands that may be specially configured for a particular use scenario. For example, some bands may be specially configured for sport or athletic activities and other bands may be configured for more formal or professional activities.

The wearable electronic device 100 may also include a rear cover 108 located on the rear-facing surface of the housing 101 of the device body 110. The rear cover 108 may improve the strength and/or scratch resistance of the surface of the wearable electronic device 100. For example, in some embodiments, the rear cover 108 may be formed from a sapphire sheet, zirconia, or alumina material having superior scratch resistance and surface finish qualities. In some cases, the sapphire material has a hardness greater than 1 on the Mohs scale. In some cases, the sapphire material has a hardness of approximately 9 on the Mohs scale. Due to the superior strength of the sapphire material, a cover glass formed from a sapphire sheet may be very thin. For example, the thickness of a sapphire cover sheet may be less 300 microns thick. In some cases, the thickness of a sapphire cover sheet may be less than 100 microns thick. In some cases, the thickness of a sapphire cover sheet may be less than 50 microns thick. In some embodiments, the rear cover 108 is contoured in shape. For example, the rear cover 108 may have a convex curved surface.

FIG. 1B illustrates a mobile electronic device 130 which may be a companion device of the wearable electronic device 100 of FIG. 1A. The illustrated mobile electronic device 130 includes a display 150 for providing an operating system or application graphical interface. In one embodiment the display 150 is a multi-function touchscreen display configured to accept touch or electronic pen input from a user. The mobile electronic device 130 can include one or more processing units, one or more network or other communications interfaces, memory, and one or more communication buses for interconnecting these components. The mobile electronic device 130 can execute an operating system that facilitates the execution of applications within memory of the mobile electronic device 130. Application programs may include phone programs, e-mail programs, personal information management (PIM) programs, word processing programs, spreadsheet programs, Internet browser programs, messaging programs, and the like. One or more of the application programs can work on concert with application programs executing on the wearable electronic device 100. For example, launching an application program on the mobile electronic device 130 or interacting with the application program via the display 150 can launch an application or cause an action to be performed on the wearable electronic device 100. In one embodiment, interacting with an application on the mobile electronic device 130 can cause an associated application on the wearable electronic device 100 to become a front-most application. In embodiments described herein, the front-most application executing on the wearable electronic device 100 can be granted enhanced execution capabilities, even when the wearable electronic device 100 is in a lower-power or screen-off state.

Figure 2A:
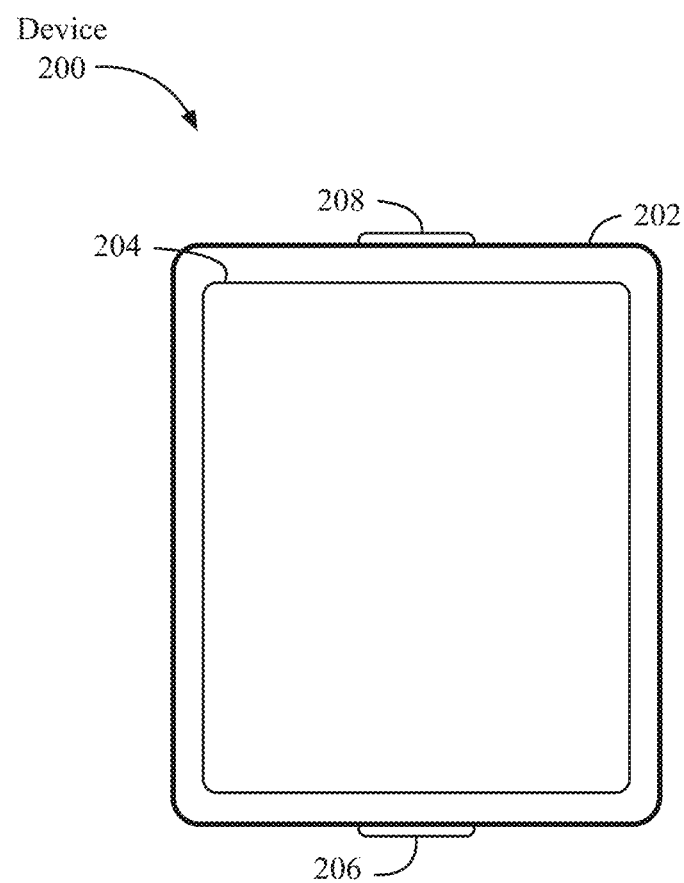
FIG. 2A-2B illustrate components of a wearable electronic device, according to an embodiment.
Figure 2B:
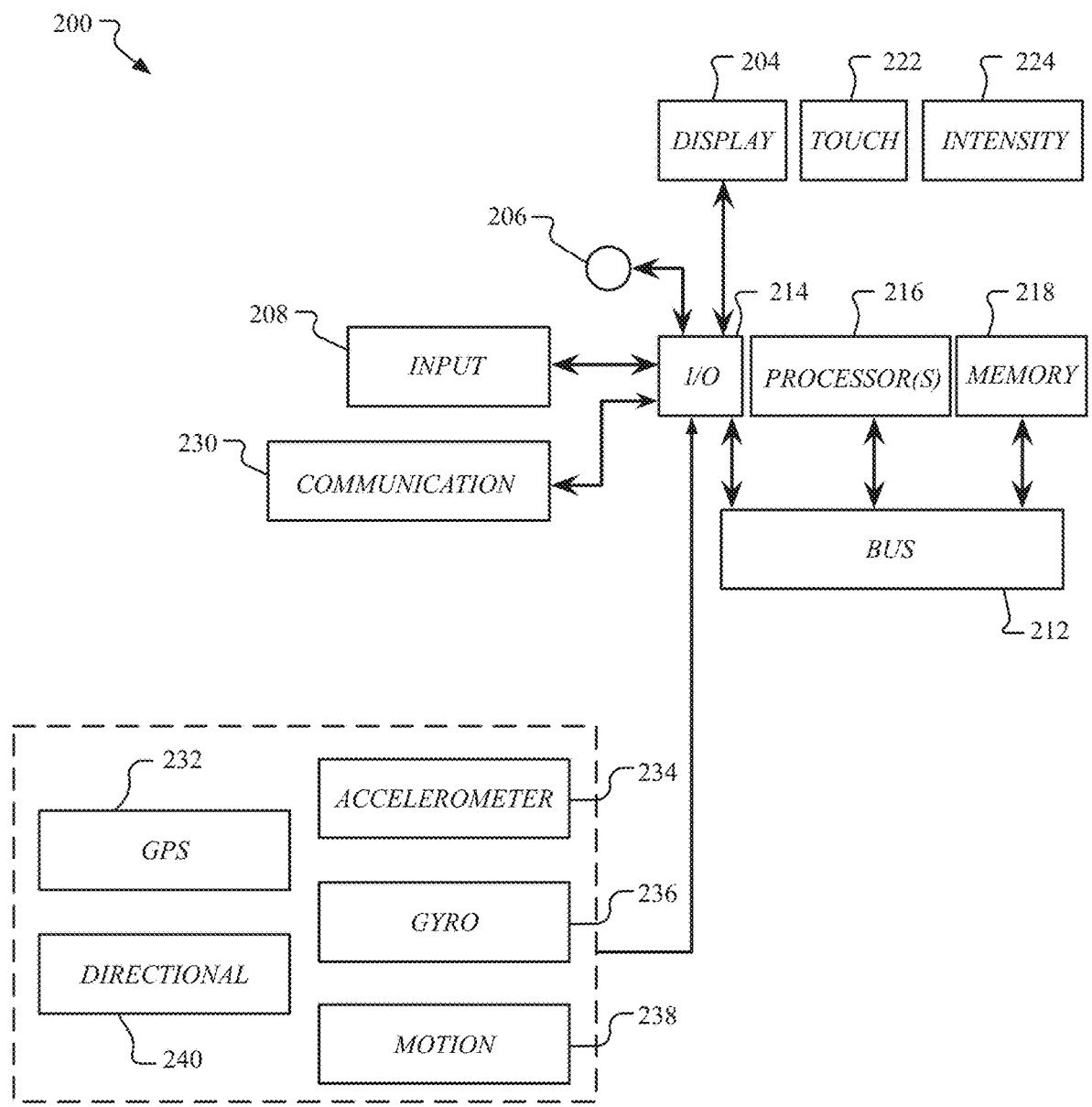

FIG. 2A-2B illustrate components of a wearable electronic device, according to an embodiment. FIG. 2A illustrates an external view of a wearable electronic device 200. FIG. 2B depicts internal components of the wearable electronic device 200.

As shown in FIG. 2A, device 200 includes body 202. In some embodiments, device 200 can include some or all of the features described with respect to device 100 of FIG. 1A. In some embodiments, device 200 has touch-sensitive display screen (e.g., touchscreen 204). Alternatively, or in addition to touchscreen 204, device 200 has a display and a touch-sensitive surface. In some embodiments, touchscreen 204 (or the touch-sensitive surface) may have one or more intensity sensors for detecting intensity of contacts (e.g., touches) being applied. The one or more intensity sensors of touchscreen 204 (or the touch-sensitive surface) can provide output data that represents the intensity of touches. The user interface of device 200 can respond to touches based on their intensity, meaning that touches of different intensities can invoke different user interface operations on device 200.

In some embodiments, device 200 has one or more input mechanisms 206 and 208. Input mechanisms 206 and 208, if included, can be physical. Examples of physical input mechanisms include push buttons and rotatable mechanisms. In some embodiments, device 200 has one or more attachment mechanisms. Such attachment mechanisms, if included, can permit attachment of device 200 with, for example, hats, eyewear, earrings, necklaces, shirts, jackets, bracelets, watch straps, chains, trousers, belts, shoes, purses, backpacks, and so forth. These attachment mechanisms may permit device 200 to be worn by a user.

As shown in FIG. 2B device 200 has bus 212 that operatively couples I/O section 214 with one or more computer processors 216 and memory 218. The one or more processors 216 can include a low power system processor or processor core and a higher-powered application processor or processor core. The one or more computer processors 216 can also include a secure processor, such as but not limited to a secure enclave processor (SEP). The one or more computer processors 216 and I/O section 214 can be connected to a touchscreen display 204, which can have touch-sensitive component 222 and, optionally, touch-intensity sensitive component 224. In addition, I/O section 214 can be connected with communication unit 230 for receiving application and operating system data, using Wi-Fi, Bluetooth, near field communication (NFC), cellular, and/or other wireless communication techniques.

Device 200 can include input mechanisms 206 and/or 208. Input mechanism 206 may be a rotatable input device or a depressible and rotatable input device, for example. Input mechanism 208 may be a button, in some examples. Input mechanism 208 may be a microphone, in some examples. Device 200 can include various sensors, such as GPS sensor 232, accelerometer 234, directional sensor 240 (e.g., compass), gyroscope 236, motion sensor 238, and/or a combination thereof, all of which can be operatively connected to I/O section 214.

Memory 218 of wearable electronic device 200 can be a non-transitory computer-readable storage medium, for storing computer-executable instructions, which, when executed by one or more computer processors 216, for example, can cause the computer processors to perform the techniques described herein. The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. Device 200 is not limited to the components and configuration of FIG. 2B, but can include other or additional components in multiple configurations.

Wearable Device Configuration

Figure 3A:
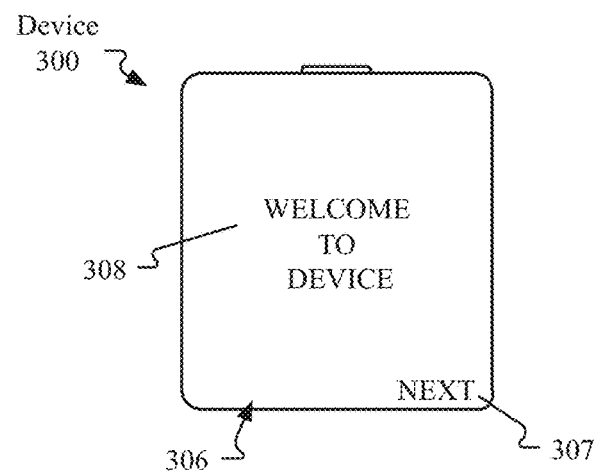
FIG. 3A-3C illustrate exemplary welcome and instruction screens for a wearable device.

FIG. 3A shows an exemplary welcome screen 306 that a device 300 can display on its display. Device 300 may transition from displaying a boot-up screen to displaying welcome screen 306 after at least a portion of the boot-up process has completed. Welcome screen 306 may include a welcome message 308 containing any desired text, image, icon, animation, video, or the like. Welcome screen 306 may also include an affordance 307 showing the text "NEXT". As used herein, the term "affordance" refers to a user-interactive graphical user interface object that may be displayed on the display screen of device 300. For example, an image (e.g., icon), a button, and text (e.g., hyperlink) may each constitute an affordance. In some embodiments, a user may select an affordance via a mouse gesture (e.g., hover, click, double-click, drag). In some embodiments, a user may select an affordance via a touch-based gesture (e.g., tap, swipe, flick, long touch).

A user may select the displayed affordance 307 to instruct device 300 to continue to the next step or screen in the initialization process. For example, in response to a tap gesture on affordance 307, electronic device 300 may continue the initialization process. Alternatively, a user may cause the electronic device 300 to transition to the next screen or continue the initialization process by a swipe gesture from right to left on the touch-sensitive display or using the rotatable input mechanism (e.g., input mechanism 206).

In one embodiment, electronic device 300 continues the initialization process by transitioning the display to an optional personalized message screen. A personalized message screen may include a personalized message containing any desired text, image, icon, animation, video, or the like.

Figure 3B:
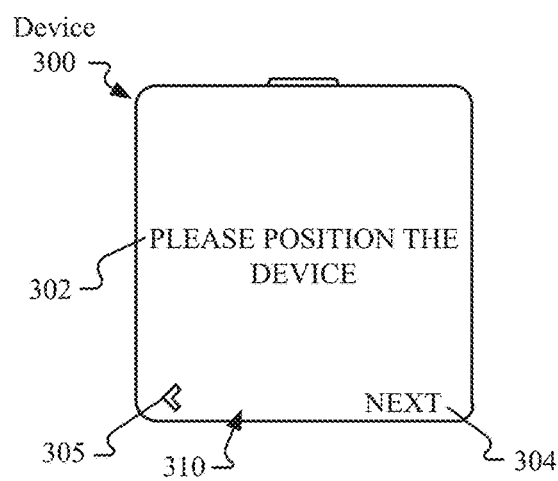

FIG. 3B shows an exemplary instruction screen 310 that device 300 can display on its display is described. The instruction screen 310 may include an image, icon, animation, video, text, or the like that prompts the user to take an action. For example, instruction screen 310 includes text 302 instructing the user to position the device. In one embodiment, a user may be instructed to attach the electronic device 300 to a body part such as one of the user's wrist.

Instruction screen 310 also includes affordances 304 and 305. Affordance 304 has an icon including the text "NEXT". Selecting affordance 304 may instruct device 300 to continue to the next step or screen. That is, in response to a tap gesture on affordance 304, electronic device 300 continues the setup process. A user may select affordance 304 to indicate that the user has complied or intends to comply with the instruction text 302. In an alternate embodiment, the device detects, using one or more biometric sensors, that the user has positioned the device and advances to screen 320 of FIG. 3C without the need for user contacting affordance 304. Affordance 305 includes an icon of an arrow head pointing to the left. A user may select affordance 305 to cause device 300 to display the previous screen. That is, in response to a tap gesture on affordance 305, electronic device 300 returns to a previous step or displays a screen displayed prior to screen 310.

Figure 3C:
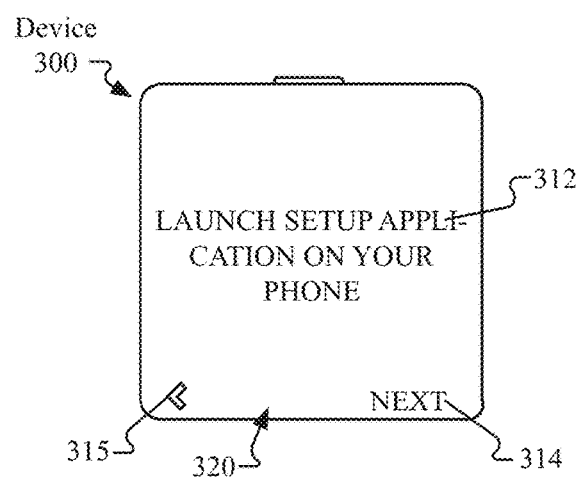

FIG. 3C shows another exemplary instruction screen 320 that device 300 can display on its display. Instruction screen 320 may be displayed to prompt a user to take an action that will initiate pairing of the electronic device 300 with an external electronic device, such as the mobile electronic device 130 of FIG. 1B.

The external device may operate in a pairing mode that allows it to pair with another device, such as device 300. As used herein, pairing mode refers to an operating mode in which two devices attempt to register one another for future wireless communications. For example, the process of initially connecting two Bluetooth-enabled devices involves entering into pairing mode on the devices.

In some embodiments, wireless communication, for purposes of pairing, occurs over a peer-to-peer wireless communication protocol such as Bluetooth and/or Bluetooth Low Energy (BTLE). In some embodiments, wireless communication for purposes of pairing functionality utilizes more than one wireless communication protocol. For example, Wi-Fi may be used in addition to BTLE. In these embodiments, an initial communication between two devices may occur over a lower powered protocol, such as BTLE, even if the protocol yields a slower data transfer speed. Subsequent communications may occur over a secondary network that is relatively faster, such as Wi-Fi.

The pairing mode of the external device may be invoked by running a software program. The software program may be part of an operating system or an application program. In one embodiment, the external device displays an affordance (e.g., a selectable icon) representing an application for pairing the external device with another device (e.g., device 300). Selecting the application affordance may launch the application and invoke the pairing mode.

In some embodiments, the application affordance is displayed on the external device only when device 300 is within communication range of the external device. For example, device 300 may wirelessly transmit data that represents a request to pair or that indicates it is capable of pairing with another device. If the external device is not within communication range, the affordance is not displayed. However, if the external device receives the data, and therefore is within communication range of device 300, then the application affordance is displayed.

In another embodiment, when the external device is not within range, the application affordance is displayed but in a manner that indicates that the application cannot be launched. For example, the application affordance may appear greyed-out or semi-transparent to indicate that the application cannot be launched. When the external device comes within communication range of device 300, the visual appearance of the application affordance may be changed to indicate that the application can be invoked.

Instruction screen 320 includes text 312 instructing the user to launch an application on the user's phone to pair the device 300. In one embodiment, the application is launched by executing a tap gesture on an affordance associated with the application displayed on the user's phone. The application may invoke a wireless communications pairing mode for pairing the device 300 with the user's phone.

Instruction screen 320 also includes affordances 314 and 315. Affordance 314 has an icon including the text "NEXT". Selecting affordance 314 may instruct device 300 to continue to the next step or screen. That is, in response to a tap gesture on affordance 314, electronic device 300 continues the setup process. Accordingly, a user may select affordance 314 to indicate that the user has complied or intends to comply with the instruction text 312. That is, selecting affordance 314 may indicate that the user has or intends to launch an application program for pairing the phone with the electronic device. Affordance 315 includes an icon of an arrow head pointing to the left. A user may select affordance 315 to cause device 300 to display the previous screen. That is, in response to a tap gesture on affordance 315, electronic device 300 returns to a previous step or displays a screen displayed prior to screen 320.

FIG. 4A shows an additional instruction screen 400 that device 300 can display on its display. Instruction screen 400 may be displayed after screen 320 of FIG. 3C to facilitate setup of the device 300 via an external device 450. Instruction screen 400 includes text 402 instructing the user to take a picture of instruction screen 400 with a camera on the external device 450 or to otherwise position device 300 such that device 300 is visible to the camera of the external device 450.

Instruction screen 400 also includes an image containing a pattern 404. The displayed image may include wavelengths that are visible to the human eye. The image may also include wavelengths that are invisible to the human eye but can be produced by the display on device 300 and detected by the camera of external device 450. In one embodiment, the instruction screen 400 may display an invisible image containing the pattern 404 along with a visible image. The visible image may be aesthetically appealing to the user, while the invisible image may contain information that can be and/or is easier to recognize and/or process by a processor facilitating the pairing.

The pattern 404 may be used to identify or authenticate the device 300. In one embodiment, the pattern comprises identifying information of the device 300. Identifying information may include any design, symbol, pattern, sequence, indication, or the like that identifies the device 300, such as a quick response code or a bar code. The identifying information may be unique to device 300 or may generally indicate the type of device.

FIG. 4B shows an external device 450 that may be paired or associated with device 300. Device 300 can be paired with the external device 450 or can be configured for a user other than the user of the external device 450. When device 300 is configured for another user, device 300 can be configured as a satellite device that is not directly paired with but may be at least partially managed by the external device 450. For example, device 300 can be configured as a device to be worn by a child or other minor-aged relative of the user associated with the external device 450. Device 300 may also be configured for use by an adult member of a family of accounts that is associated with the external device 450. Device 300 may also be configured for an employee associated with external device 450, where external device 450 is associated with an enterprise management account.

In one embodiment, external device 450 is a phone with a camera that may be used to take a picture of device 300 while instruction screen 400 is displayed. Using the camera of external device 450, a user may obtain an image containing a visual representation of the device 300 including the pattern 404 displayed on the screen of electronic device 300. External device 450 displaying an example of an obtained image 452 of electronic device 300. Image 452 shows electronic device 300 displaying instruction screen 400 with the pattern 404.

External device 450 may process the obtained image 452 to extract the identifying information contained in the pattern 404. External device 450 may then use the extracted identifying information to authenticate the device 300 for pairing. In one embodiment, the electronic device 300 transmits data via wireless communication. The data may include information identifying the electronic device 300. The data may also include information representative of the pattern displayed on screen 400. Electronic device 300 may send the data in response to an indication that the user has launched or intends to launch an application program for pairing the user's phone with device 300 (e.g., selecting affordance 314 on screen 310 as described above).

The external device 450 may receive the data transmitted by electronic device 300 and determine whether the identifying information in the received data corresponds with the identifying information in the image of the pattern obtained by the camera. If the external device 450 determines that the received data corresponds with the identifying information in pattern 404, then the external device 450 may register device 300 as an associated device. Alternatively, if the external device 450 determines that the received data does not correspond with the identifying information in pattern 404, then the external device 450 may not register device 300 as a paired or associated device.

Figure 4C:
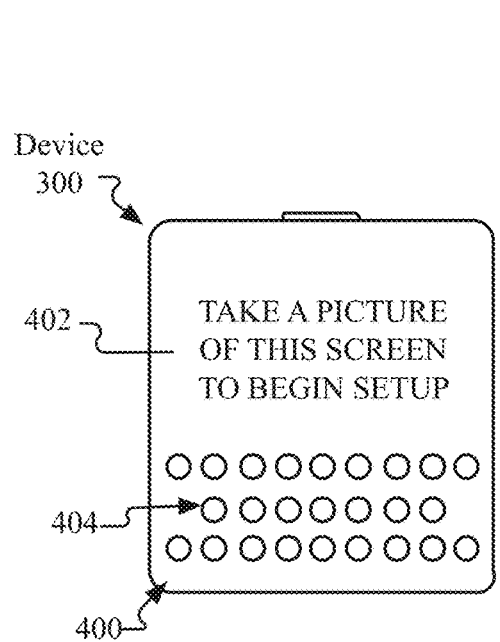
Figure 4C:
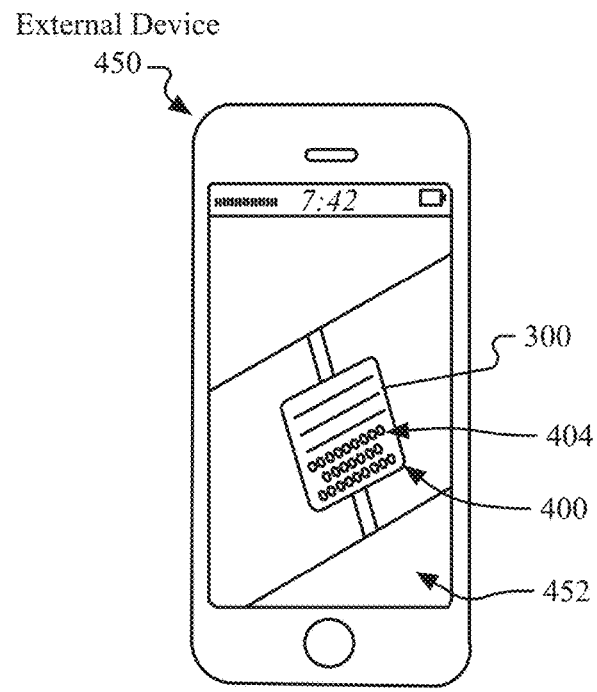
Figure 4C:
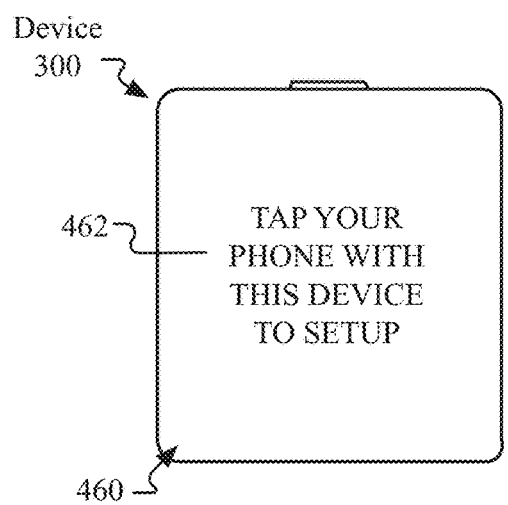

FIG. 4C shows an exemplary instruction screen 460 that device 300 can display on its display. Instruction screen 460 includes text 462 instructing the user to tap the user's phone with the device 300 to initiate setup of the device. In one embodiment, external device 450 and device 300 can be brought into close contact (e.g., via a tap) to enable an exchange of data via an NFC connection. The data exchanged can include identifying information of device 300 and keys or passcodes that can be used to establish a secure wireless connection via, for example, Bluetooth or Wi-Fi. In response to receiving the data transmitted by the device 300 and the external device 450 may register device 300 as a paired device or set up device 300 as a standalone or satellite device. The data exchange facilitated via NFC can be done in addition to as an alternative to the image-based data exchange shown in FIG. 4A-4B.

Once the device 300 has connected with the external device 450, the device 300 and/or the external device 450 may provide an indication that the devices have paired. The indication may include an aural indication, such as a chime, ping, beep, tune, or the like. The indication may also, or alternatively, include a haptic indication, such as tactile feedback in the form of buzzing, vibrating, or pulsing. In one embodiment, each device provides an indication simultaneously with the other. In another embodiment, the devices provide indications one after the other in a back-and-forth manner which indicates that the two devices are in sync.

Figures 5A, 5B:
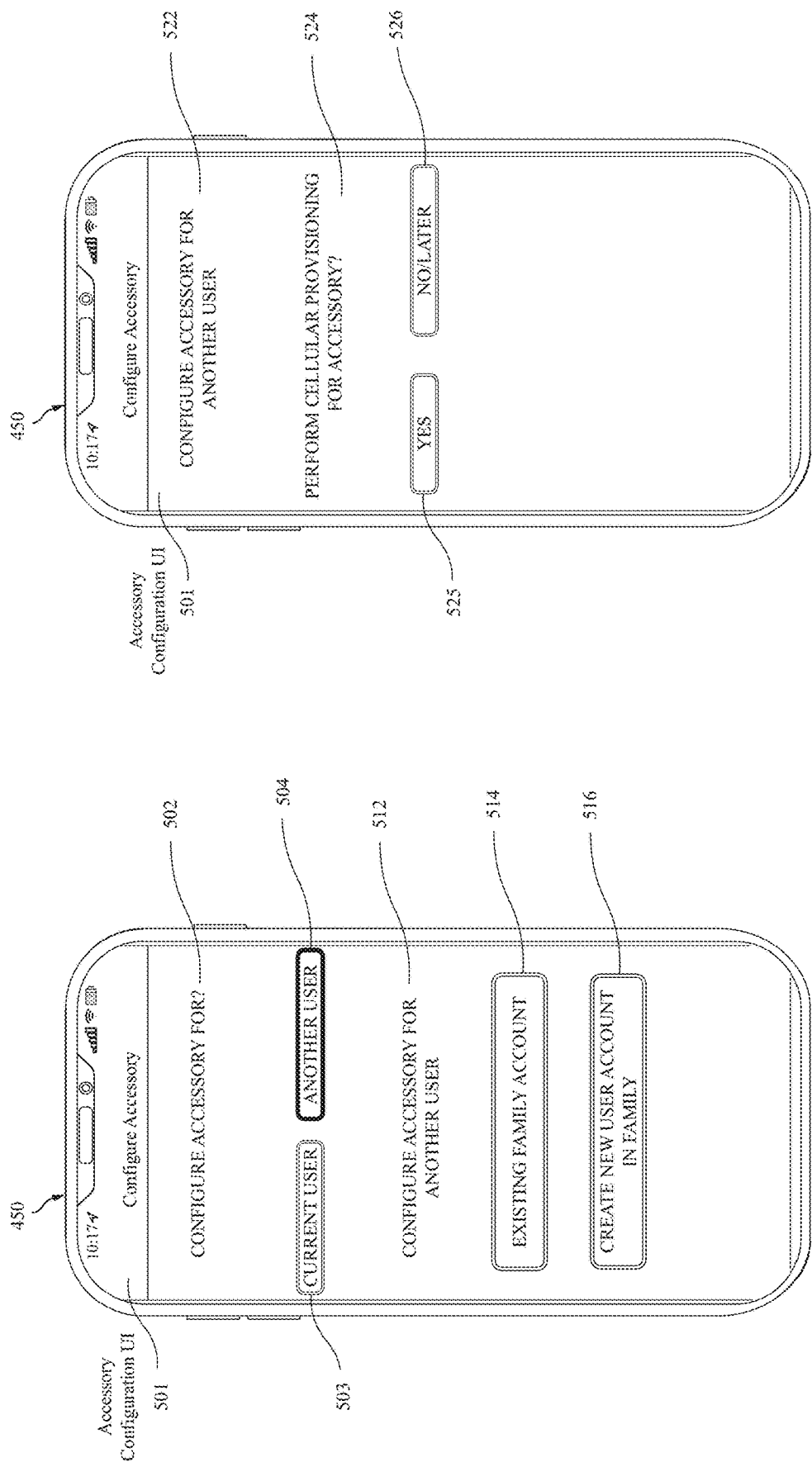

FIG. 5A-5D illustrate user interfaces to configure an accessory device as a satellite accessory. FIG. 5A shows a user interface to enable configuration of an accessory device for another user. FIG. 5B shows a user interface to facilitate cellular provisioning for a cellular enabled wireless accessory. FIG. 5C-5D show user interfaces for additional accessory configuration, including contact configuration and health sharing information. The configured accessory device can be device 300 as described above.

As shown in FIG. 5A, an external device 450 can display an accessory configuration user interface 501 after initiating setup for an accessory device as described above. The accessory configuration user interface 501 can display a prompt 502 to ask a user whether the wearable accessory device is to be configured for the current user (interface element 503) of the external device or is to be configured for another user (interface element 504). Where the accessory device is to be configured for another user, the accessory device can be configured as a standalone device that operates without a companion device. In some embodiments, a standalone wearable accessory can be a satellite accessory that is indirectly managed by the external device 450 without being persistently paired with the external device 450.

Upon selection of an option to configure an accessory device for another user (interface element 504), the accessory configuration user interface 501 can display a set of option screens to enable configuration options to enable configuration of the accessory for another user 512. In one embodiment, the accessory device can be configured as a satellite accessory associated with a user account within a family or group of user accounts. In a family of accounts, data associated with the various accounts within the family can be shared within the family of accounts. Accounts can be designated as parent or child accounts and one or more parent accounts can be configured as guardian or management accounts for the child accounts. Abilities and behaviors of child accounts can vary based on the age of the user associated with the account. The accessory configuration user interface 501 can enable a satellite accessory to be configured for an existing family account (interface element 514) or to create a new user account for the family (interface element 516) to associated with the satellite accessory. Such techniques may also be applied for an adult account within a family or for an employee account associated with a group of enterprise accounts.

In one embodiment a communication unit of a wearable electronic device (e.g., communication unit 230 of wearable electronic device 200) can be configured with a cellular baseband processor and radio to enable wireless voice and/or data network connectivity. When cellular provisioning is to be performed, the satellite accessory device is configured with a subscription profile for one or more network operators to enable the satellite accessory to communicate on a network of the network operator. If the accessory device were to be paired with a companion device, the companion device can be used to perform cellular provisioning. For a satellite accessory that is not to be persistently paired with a companion device, cellular provisioning for the satellite accessory can be performed during setup by the external device 450.

As shown in FIG. 5B, an external device 450 can be used to facilitate cellular provisioning for an accessory device that is to be configured as a satellite device. Information text 522 can be presented on the accessory configuration user interface 501 that indicates that the UI is to configure the accessory for another user. A prompt (interface element 524) can be displayed to prompt the user to indicate whether cellular provisioning for the satellite device is to be performed during setup or at a later time. An interface element 525 can be presented to allow a user to indicate that cellular provisioning is to be performed during setup. An interface element 526 can also be presented to allow a user to indicate that cellular provisioning is not to be performed or is to be performed at a later time. If cellular provisioning is to be performed at a later time, provisioning can be performed via a peer-to-peer setup, as described further below with respect to FIG. 9A and FIG. 13A-13C. In addition to cellular provisioning, the accessory configuration user interface can also be used to enable connectivity of the satellite device to wireless access points by providing access point password information to known by the external device 450 to the satellite device.

As shown in FIG. 5C, the external device 450 can display an accessory configuration user interface 501 to enable additional configuration for a satellite accessory. The accessory configuration user interface 501 can display text 532 to indicate to the user that additional configuration items after initial setup can be performed. These additional configuration items can include optional configuration elements, the setup of which can be front-loaded to the initial configuration.

In some embodiments, independent contacts management on a satellite accessory may not be enabled (or may be disabled). In one embodiment, independent contacts management may be disabled when the satellite accessory is associated with a user below a threshold age. In such embodiments, the accessory configuration user interface 501 can present a prompt 534 to enable the configuration of contacts for a satellite accessory during setup. Contact configuration can be bypassed or delayed (interface element 536) or performed (interface element 535) during setup. When contact configuration is performed, selected contacts that are stored on or associated with the external device 450 can be synchronized with the satellite accessory.

The accessory configuration user interface 501 can also present a prompt 537 to enable (538) or disable (539) an option to restrict the contacts that the satellite accessory can communicate with to a whitelist of contacts. When such restriction is enabled, incoming, outgoing, or both incoming and outgoing communication to and from the satellite accessory can be performed only a pre-selected whitelist of contacts. For example, a satellite watch for a child user can be configured that can make or accept incoming voice or text calls to parents, other family members, or other contacts that have been added to the whitelist of contacts by a parent or guardian account. When whitelist restrictions are enabled, contacts to and from emergency services may additionally be allowed.

As shown in FIG. 5D, the accessory configuration user interface 501 on the external device 450 can enable additional confirmation of optional settings, including presenting a prompt 544 to configure a medical ID for the accessory. Configuration of the medical ID can be bypassed (interface element 546) or performed during setup (interface element 545). The medical ID for the accessory can include emergency medical information for the user of the satellite accessory, as well as relatives and emergency contacts. Medical ID information stored on a satellite accessory can be accessed even when the accessory is locked.

In one embodiment, the accessory configuration user interface 501 can include a prompt 547 to enable the configuration of health sharing information. Health information sensed by sensors on the accessory can be aggregated by a health monitoring application that executes on the satellite accessory. During setup, health sharing information can be configured (interface element 548) or bypassed (interface element 549). If health sharing is to be configured, data from the health monitoring application can be shared with the parent or guardian account associated with the satellite accessory.

Figure 6A:
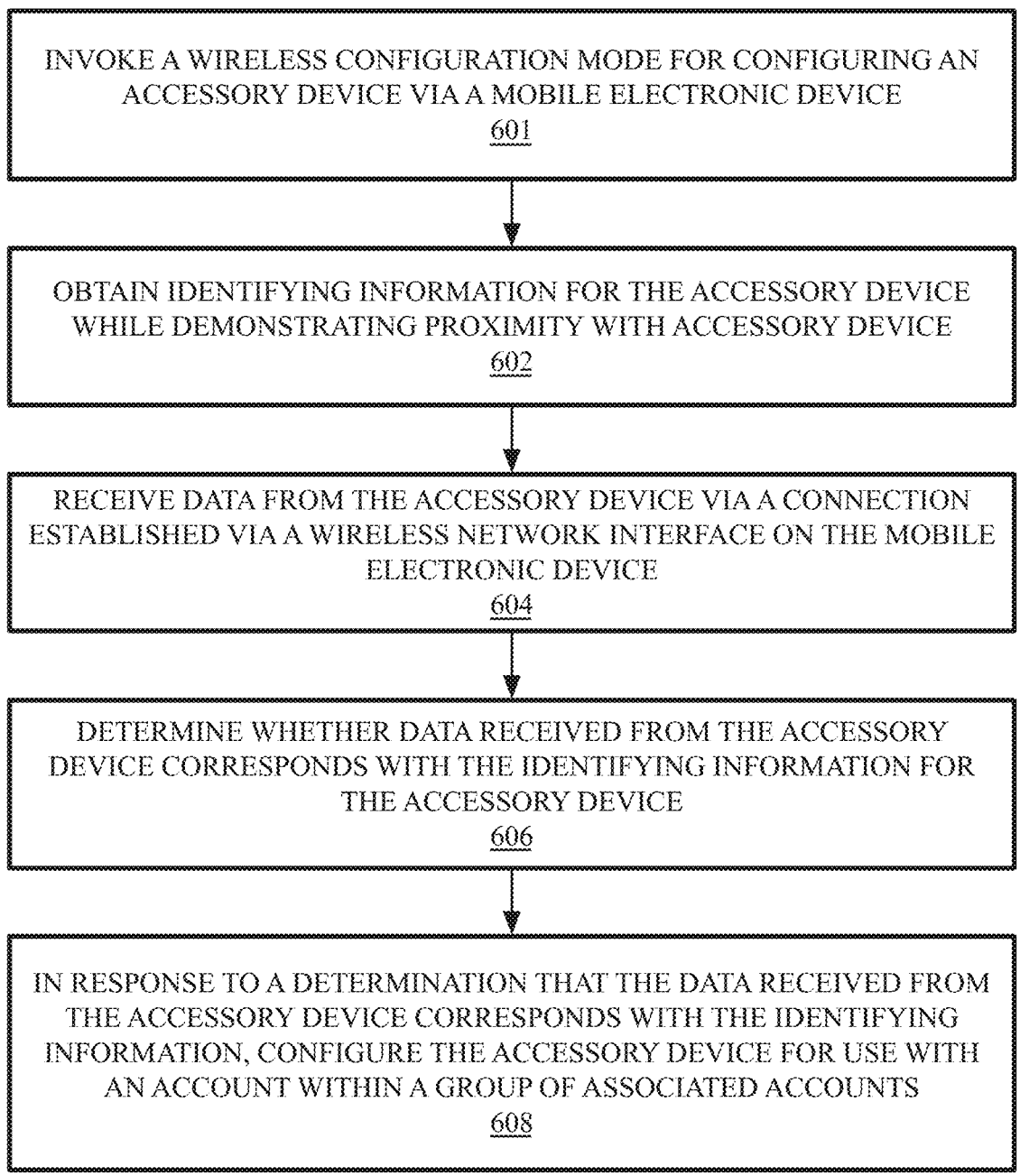
FIG. 6A-6B illustrate methods to configure an accessory device as a satellite accessory.
Figure 6B:
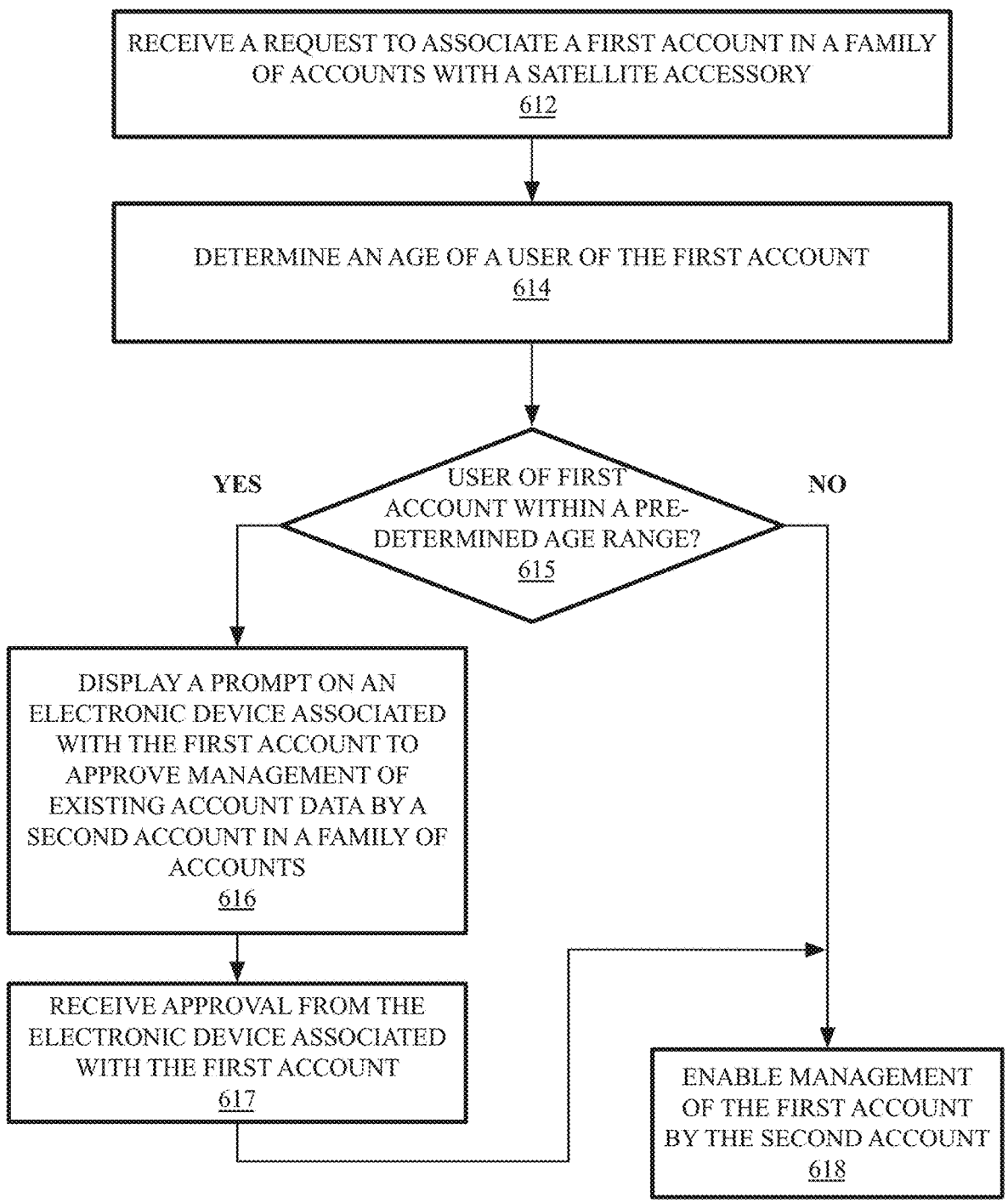

FIG. 6A-6B illustrate methods to configure an accessory device as a satellite accessory. FIG. 6A illustrates a method 600 that includes operations at an external device to configure an accessory device for use by an account different than the active account of the external device. FIG. 6B illustrates a method 610 that includes operations at a computing device of a child account to approve management of an existing account if the existing account is to be associated with a satellite accessory.

As shown in FIG. 6A, method 600 includes invoking a wireless configuration mode for configuring an accessory device via a mobile electronic device (block 601). The wireless communications configuration mode can be invoked as illustrated above in FIG. 3A-3C and/or FIG. 4A-4C. During wireless configuration, the external device can obtain identifying information for the accessory device while demonstrating proximity with accessory device (block 602). Demonstration of proximity between the mobile electronic device (e.g., external device 450) and the accessory device (block 300) may be required as a security measure to demonstrate that the user of the mobile electronic device is in possession of the accessory device to be configured. Proximity can be configured via an image capture or NFC tap, as described above in FIG. 4A-4C.

Method 600 additionally includes an operation on the mobile electronic device to receive data from the accessory device via a connection established via a wireless network interface on the mobile electronic device (block 604). The connection can be established at least in part using information obtained from the accessory device, such as a wireless identifier for the accessory device. The mobile electronic device can then determine whether data received from the accessory device corresponds with the identifying information for the accessory device (block 606). For example, data received via an image capture or NFC tap can be verified with information that is received via the wireless connection with the accessory device. In response to a determination that the data received from the external device corresponds with the identifying information, the mobile electronic device can configure the accessory device for use with an account within a group of associated accounts (block 608). Configuring the accessory device can include pairing the accessory device to the mobile electronic device or associating the accessory device with an account of another user within a family of user accounts. For example, the accessory device can be configured as a satellite accessory (e.g., satellite watch) for a child user that is managed by an account of a parent.

While satellite accessories are generally for use by users that do not have a smartphone device to use as a paired companion device for the satellite accessory, such users may have accounts associated with non-smartphone devices, such as a tablet, laptop, or desktop computer. When a satellite accessory is associated with an existing account for a child user that is above a threshold age or within a pre-determined age range, the child user may be informed that existing account data may be managed by a parent or guardian user via a management device associated with the parent or guardian user. In one embodiment, depending on the configuration and/or age of the child user, the child user may be prompted to approve management of pre-existing account data. The prompt can be presented on any device that is a trusted device of the child user.

As shown in FIG. 6B, method 610 includes operations at a computing device of a child account to approve management of an existing account if the existing account is to be associated with a satellite accessory. In one embodiment a setup and/or configuration device that is used to setup or configure a satellite accessory device (e.g., external device 450 while configuring device 300) can receive a request to associate a first account in a family of accounts with a satellite accessory (block 612). The configuration device can then determine an age of a user of the first account during setup (block 614), for example, by requesting a birth date of a user associated with the account or performing a birth-date lookup within account information of the user. The configuration device, or a server in communication with the configuration device, can determine whether the user associated with the first account is within a pre-determined age range (block 615). For example, if the account is associated with a user between the ages of 13 years old and 18 years old, method 610 can trigger an operation to display a prompt on an electronic device (e.g., tablet, laptop, etc.) associated with the first account to approve management of existing account data by a second account in a family of accounts (block 616). Upon receipt of approval from the electronic device associated with the first account (block 617), the account server associated with the first account can enable management of the first account by the second account (block 618).

In some embodiments, approval is not requested if the first account that is to be used with the satellite accessory is associated with a user under a threshold age. For example, for some users an informative message may be displayed. In some embodiments, for users within a pre-determined age range, if approval to manage the user's account is not granted, some management ability of the second account may be limited. In one embodiment, such limits may be overridden when the second account is associated with a parent or guardian account within the family. In one embodiment, once a user reaches a threshold range (e.g., 18 years old), the user may opt-out of a subset of the management functionality.

Authenticating and Creating an Account on Behalf of Another User

Figure 7A:
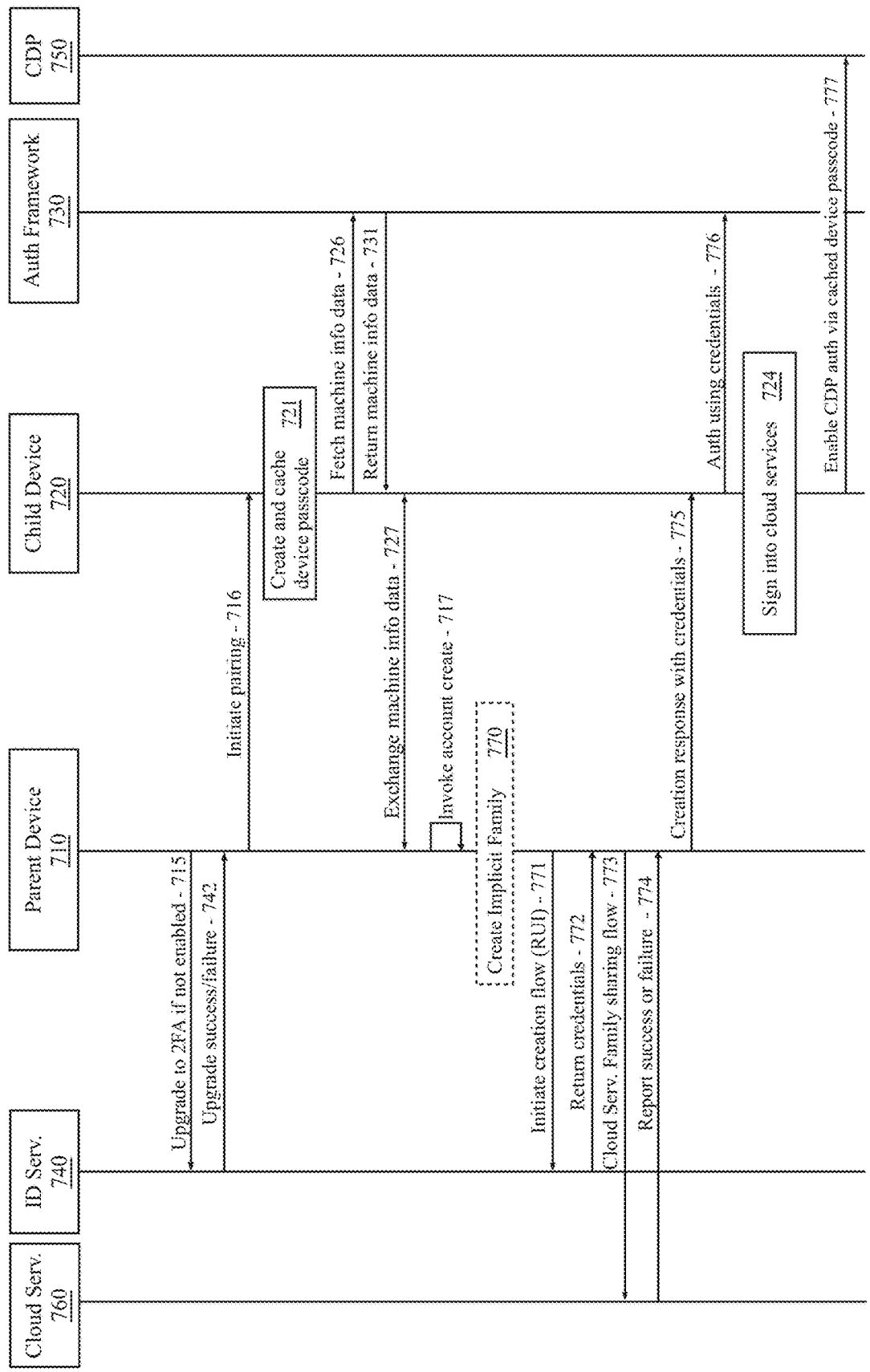
FIG. 7A-7B illustrate sequence diagrams to create and trust an account for use with a satellite accessory.
Figure 7B:
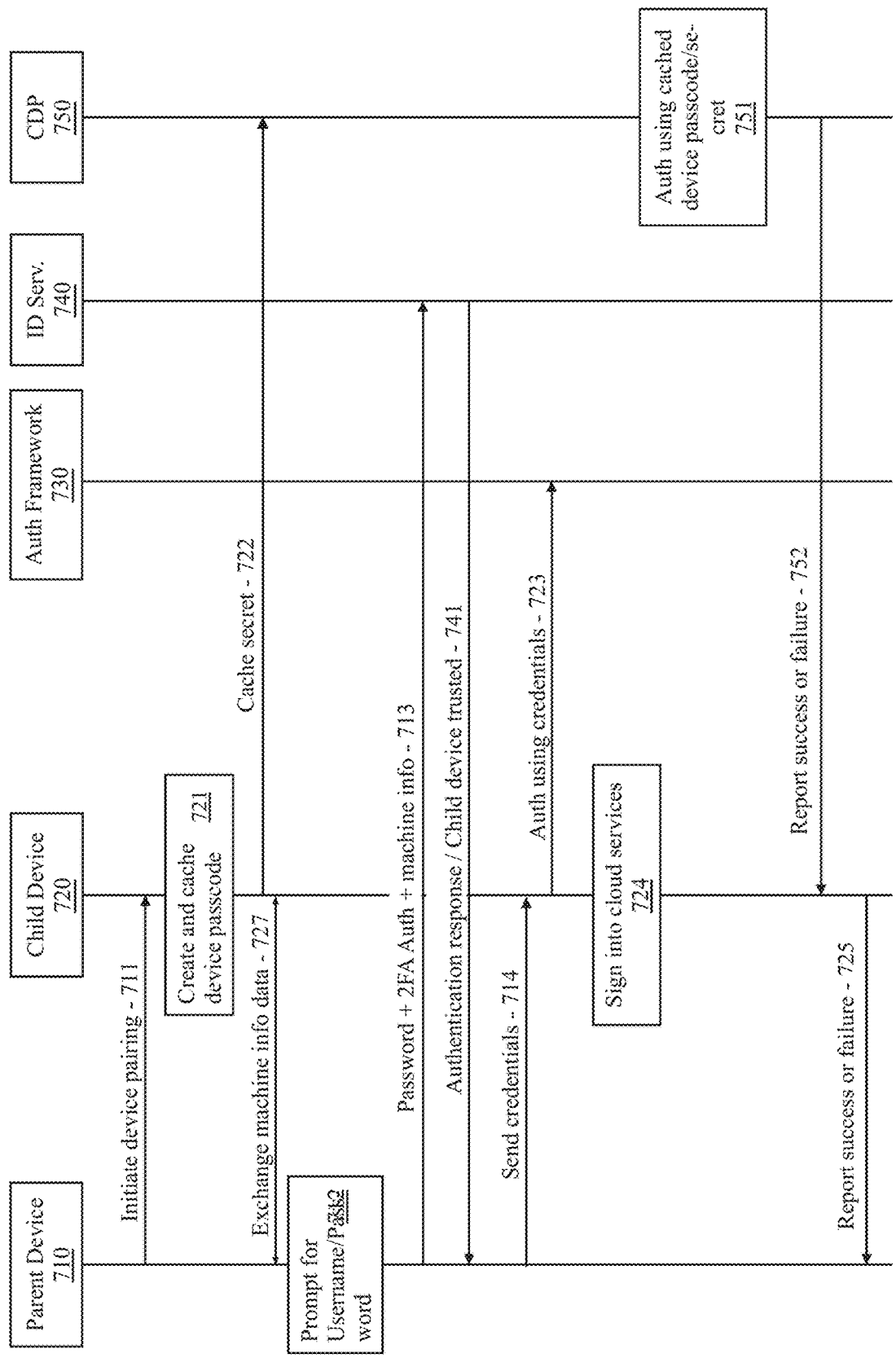

FIG. 7A-7B illustrate sequence diagrams to create and trust an account for use with a satellite accessory. FIG. 7A illustrates a sequence diagram to create and trust a new account that is to be associated with a satellite device. FIG. 7B illustrates a sequence diagram to authenticate and trust a pre-existing account that is to be associated with a satellite device. As illustrated and described in FIG. 7A-7B, a parent device 710 can be used to create or associate an account for use with a child device 720. The parent device 710 can be, for example, an external device 450 as described herein, while the child device 720 can be version of device 300 that is configured for use as a satellite device. In some embodiments, versions of the illustration operations can be used to allow delegation of account creation for use with any device and is not limited to child or satellite devices. Where parent and child in a family of accounts are described, similar techniques can also be applied to an enterprise account of a user that is managed at least in part by an enterprise management device.

As shown in FIG. 7A, the parent device 710 is first taken through a two-factor authentication (2FA) upgrade process (715) if the account associated with the parent device 710 is not already configured to use 2FA. In one embodiment, two-factor authentication is an extra layer of security that can be applied to a user account that uses additional authentication methods on top of password authentication. When two-factor authentication is enabled for an account, the account is accessible only from trusted devices. When an untrusted device attempts to access an account, a prompt is presented on trusted devices of the user that displays a passcode, passphrase, or other information that is to be entered on the untrusted device before the device becomes trusted. The two-factor authentication upgrade process can be performed in conjunction with an ID server 740 that manages a cloud services identifier that is associated with a cloud services server 760. The upgrade to 2FA will configure the ID server 740 to use 2FA whenever a user attempts to log to a service associated with the cloud services server 760 from an untrusted or unrecognized device. Success or failure of this upgrade process is communicated (742) back to the parent device 710. If the account associated with the parent device is already configured for 2FA, the upgrade process can be bypassed.

The parent device 710 can then perform an operation (716) to initiate a wireless pairing with the child device 720. The paring operation can be enabled using techniques described above with respect to FIG. 3A-3C and FIG. 4A-4C. This wireless paring is a temporary pairing for use in configuring the child device 720 and will not be maintained persistently once configuration is complete. Upon pairing with the parent device 710, the child device 720 can perform an operation (721) to create and cache a device passcode. The child device 720 can prompt the user of the device to enter a passcode, which can be a numeric or alphanumeric passcode or PIN, which can also be subsequently used to unlock the child device 720 from a locked state. On the child device 720 the passcode can also be used as a substitute for entering username and password information for a cloud services account on the user interface of the child device 720, as the child device may be, for example, a smart watch having a small display and input surface. The passcode can also be used or converted into a peer-to-peer encryption secret to encrypt data channels between devices associated with the account that is to be configured for the child device 720. The child device can cache the passcode that is created for later use.

An encrypted channel can then be set up between the child device and the parent device to exchange machine information. This encrypted channel is created via an authentication framework 730 on each of the parent device and the child device. Via the authentication framework 730, the child device can request machine information from the parent device and the parent device can request machine information from the child device.

Software logic on the child device 720 can connect with the authentication framework 730 on the child device 720. The child device 720 can fetch machine information data (726) for the parent device 710 via the authentication framework 730, which will return the requested machine information data (731). A similar process can occur on the parent device 710, which can fetch and receive machine information for the child device 720. Thus, the respective authentication frameworks 730 enable the exchange of machine information data (727) between the parent device 710 and the child device 720. The machine information data for the parent device 710 and the child device 720 can include unique hardware identifiers for each device. Various keys and identifiers can be generated based on the unique hardware identifiers that enable the establishment of secure communication channels between the parent device 710 and the child device 720. The machine info data, in one embodiment, can also include data that can be used to attest to the validity and authenticity of the parent device 710 and the child device 720.

The parent device 710 can then invoke an account creation operation (717), which can include an operation to create an implicit family or group (770) if the account associated with the parent device is not associated with an account family or group. During this process, an account for the child device is created via the parent device. The account for the child device is created on behalf of the child device 720 by the parent device 710 to make the account creation process easier and more convenient, as the child device 720 may have a display or input surface that is limited in size.

During the account/family creation process, the parent device 710 can communicate with the ID server 740 to initiate an account creation flow (771). The account creation flow can be performed via a remote user interface (RUI) that is provided by the ID server 740 and presented fully on the parent device 710. The account creation flow includes various interactions such as collecting information about child account (i.e. age, name, etc.) as well as verification via a configured second factor for the account to be created and/or the account that is being used to create the new account. During the creation flow, account credentials (e.g., username, password, etc.) are requested by the ID server 740 via the RUI presented on the parent device 710. At the end of the creation flow, the child device is considered a trusted device. The ID server 740 can then return the credentials (772) supplied for the account the parent device 710.

The parent device 710 can then connect with the cloud services server 760 to configure family sharing (773) for any data that is to be shared between the accounts, such as but not limited to shared calendars, shared application, book, or media purchase information, or shared media libraries. The cloud services server 760 can report (774) success or failure for each share that is attempted to be configured.

The parent device 710 can then send a creation response (775) with credentials for the new account to the child device 720. The child device 720 can then authenticate (776) with the authentication framework 730 on the child device. In one embodiment the authentication process makes use of authentication based on a password authenticated key agreement protocol (PAKE). Once the child device 720 is authenticated with its instance of the authentication framework 730, the child device 720 can perform operations to sign into cloud services (724) that are provided by the cloud services server 760. In one embodiment, the cloud services are those associated with iCloud, as provided by Apple Inc. of Cupertino California, but are not limited to any specific cloud or remote service provider.

The child device 720 can also enable the use of cloud data protection services (CDP 750) via the cached device passcode (777) or a cryptographic secret derived using the device passcode. Once CDP services are enabled using the cached device passcode (or a secret derived using the device passcode), the child device 720 can be configured to securely access protected cloud data using the device passcode instead of account credentials that were used to create the account for the child device 720. Access to CDP services via the device passcode may be enabled by creating a cryptographic association between the cached device passcode or a secret derived therefrom, and the credentials associated with the cloud services account that is assigned to the child device 720. In one embodiment, the cached device passcode or derived secret can be used to decrypt or unlock encrypted credentials that are stored for the cloud services account. In one embodiment, the cached device passcode or derived secret can be used to unlock an authentication token that may be provided to a server associated with the CDP 750. Occasional entry of the full account password may be required, for example, if the wrong device passcode is entered. Periodic entry of the full account password, or complete account credentials, may also be requested.

FIG. 7B illustrates operations to associate a pre-existing account within a family or group of accounts with a satellite accessory device (e.g., child device 720), for example, in response to the selection of interface element 516 of FIG. 5A. The parent device 710 can perform an operation to initiate device pairing (711) with the child device 720. The paring operation can be enabled using techniques described above with respect to FIG. 3A-3C and FIG. 4A-4C. As in FIG. 7A, this wireless paring is a temporary pairing for use in configuring the child device 720 and will not be maintained persistently once configuration is complete. Upon pairing with the parent device 710, the child device 720 can perform an operation (721) to create and cache a device passcode. The child device 720 can prompt the user of the device to enter a passcode, which can be a numeric or alphanumeric passcode or PIN, which can also be subsequently used to unlock the child device 720 from a locked state. On the child device 720 the passcode can also be used as a substitute for entering username and password information for a cloud services account on the user interface of the child device 720. In one embodiment, the child device 720 can use the device passcode to generate a cryptographic secret. The generated secret can be cached (722) within cloud data protection services (CDP 750) on the child device 720 for use after the child device 720 has been trusted.

In one embodiment, the parent device 710 and the child device 720 can exchange machine information data (727) via an authentication framework 730 on each device, as described above in FIG. 7A. Additionally, a prompt (712) for a username and password, or other credentials, can be displayed on the parent device 710 on behalf of the child device 720. The username and password for the account to use on the child device 720 is entered on the parent device 710 due to the ease of use of the parent device 710 for credential entry relative to the child device 720. For example, the parent device 710 may have a larger touch screen display than the child device 720, with an associated larger on-screen input mechanism. Once the username and password are entered on the parent device 710, 2FA data may also be sent to the parent device 710 or displayed on another computing device associated with the user account on the parent device 710. The received password and 2FA authorization data (713) is then transmitted to the ID server 740 that manages a cloud services identifiers for the accounts of the parent device 710 and child device 720. In one embodiment, machine information data for the parent device 710 and/or child device 720 is also sent to the ID server 740 to identify the child device that is to be trusted.

The ID server 740 will return (741) an authentication response and, if the authentication was successful, an indication that the child device 720 is now trusted by the ID server 740. The parent device 710 can then send credentials (714) to the child device 720 that can be used to authorize the child device with the authentication framework 730. The credentials can be used by the child device 720 to authorize (723) with the authentication framework 730. The child device 720 can perform operations to sign into cloud services (724).

Additionally, authorization (751) with cloud data protection services (CDP 750) can be performed to enable the child device 720 to access protected data using the cache device passcode of the child device 720, or the cryptographic secret derived from the device passcode. Once authentication to CDP 750 is successfully completed, the user of the child device 720 can access protected cloud data without requiring the user to re-enter the credentials for the account each time protected cloud services are to be accessed, although occasional entry of the full account password may be required, for example, if the wrong device passcode is entered. Periodic entry of the full account password, or complete account credentials, may also be requested. CDP 750 can report (752) success or failure of the authentication attempt using the cached device passcode or secret to the configuration software on the child device 720, which can relay (725) the report of success or failure to the parent device 710.

User Interfaces to Facilitate Use as a Primary Device

FIG. 8A-8F illustrate exemplary user interfaces to enable use of a wearable accessory device as a primary device. As shown in FIG. 8A-8F, a device 800, such as a smartwatch, when configured for use as a primary device that is not persistently paired with a companion device, can include a variety applications having user interfaces that are tailored for use with a small display and touchscreen. Device 800 can be a variant of device 200 or device 300 as described above, and can include a body 802, touchscreen display 804, and one or more inputs 808. Exemplary applications that can execute on device 800 include but are not limited to media library applications, calendar applications, contact management applications, messenger applications, and settings applications. In some instances, input into applications that execute on the device 800 can be facilitated via remote text input from an external device. Additionally, when used as a primary device for a user, device 800 can provide a location for the user for location sharing services. In one embodiment, device 800 includes a standalone application store that enables additional applications to be downloaded to device 800. While a variety of user interfaces are described herein, some wearable electronic devices may operate without a display or a graphical user interface, or may present a user interface remotely on a separate device.

Figure 8A:
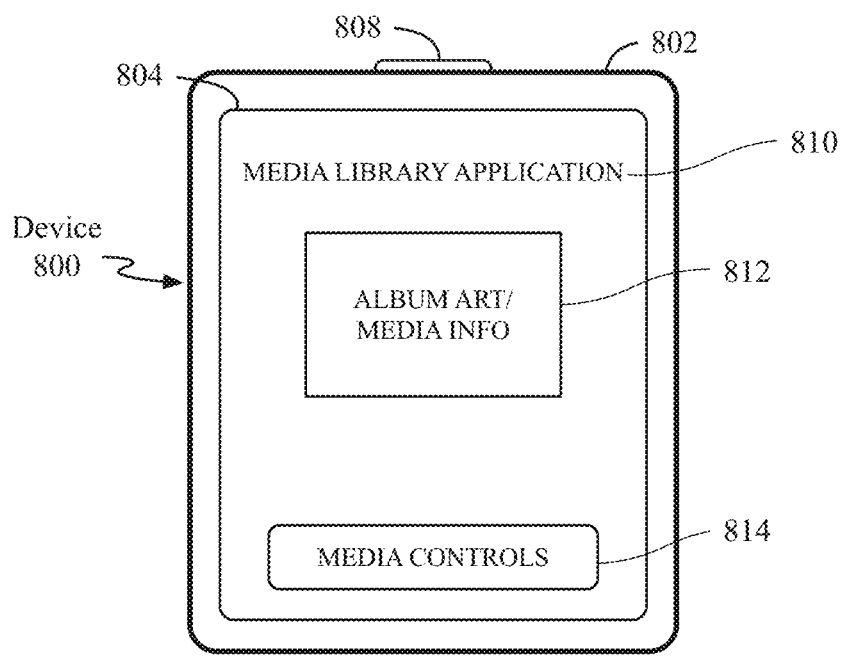
FIG. 8A-8F illustrate exemplary user interfaces to enable use of a wearable accessory device as a primary device.

FIG. 8A illustrates a user interface 810 for an exemplary media application. The user interface 810 for the media application can be displayed on the touchscreen display 804 of device 800. User interface 810 can present a user interface element 812 that displays information such as album art or information with respect to the currently playing media. User interface 810 can also include media controls 814 to enable a user to control (e.g., pause, resume) media playback or change to a previous or next media item within an album or playlist.

Figure 8B:
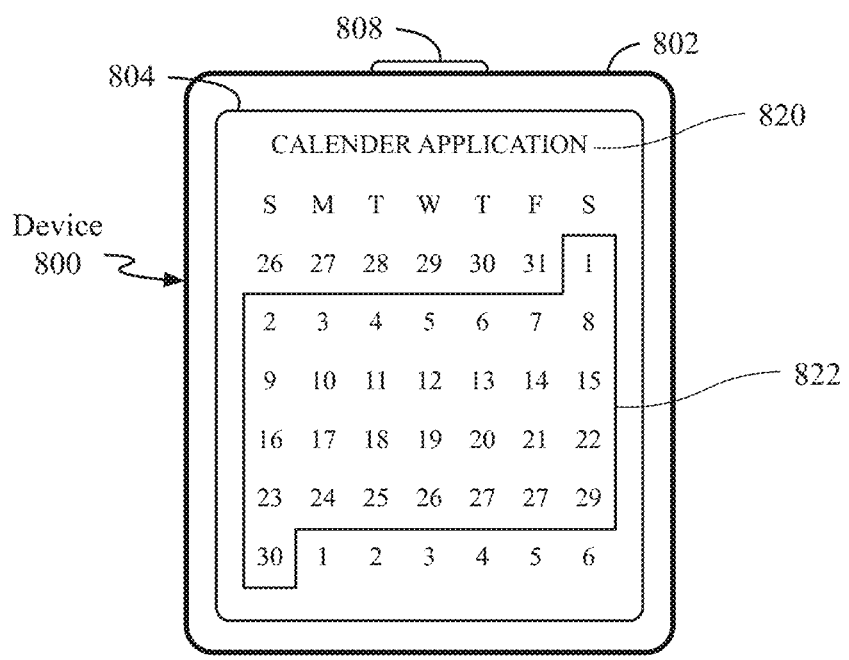

FIG. 8B illustrates a user interface 820 for an exemplary calendar application. Multiple calendar views can be presented, including a month view 822, or a one-week/one-day view (not shown). The calendar application can enable management of private and shared calendar data in a manner similar to the calendar application of a smartphone. User interface 820 can also show calendar entries that are shared with other users, including calendar entries for a family calendar that is shared with other user accounts within a family of associated user accounts.

Figure 8C:
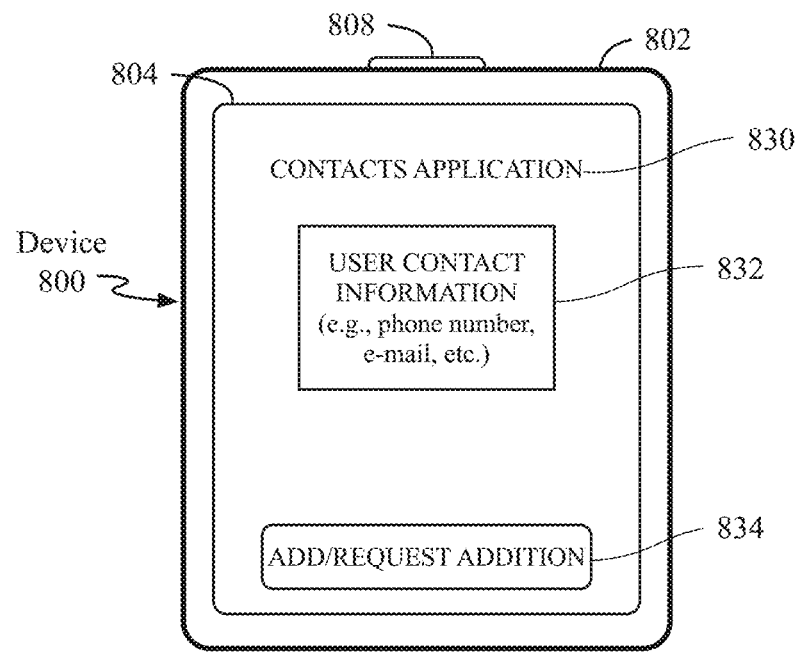

FIG. 8C illustrates a user interface 830 for an exemplary contacts application. User interface 830 can display an interface element 832 that presents information for a contact entry in a contacts database. The contacts database can be stored partially on device 800 and partially within an online contacts database for an account that is logged in to the device. An interface element 834 can also be presented to enable a user to add contacts. A similar interface element can also enable the removal of contacts.

Where device 800 is configured as a satellite device for a child user, user interface 830 may not allow the independent addition of contacts. Instead, interface element 834 may trigger an authorization request to a management device, such as a smartphone device of a user that is configured as a parent or guardian within the family of user accounts or a manager of a group of enterprise accounts. Device 800 may enter new contact information manually and request authorization to add that contact to a contacts database. In one embodiment, device 800 can receive contact information from a device associated with a contact to be added, for example, via messenger application or via a short range wireless connection (e.g., NFC). The user of the device 800 can then add or request addition of the contact information via interface element 834.

Figure 8D:
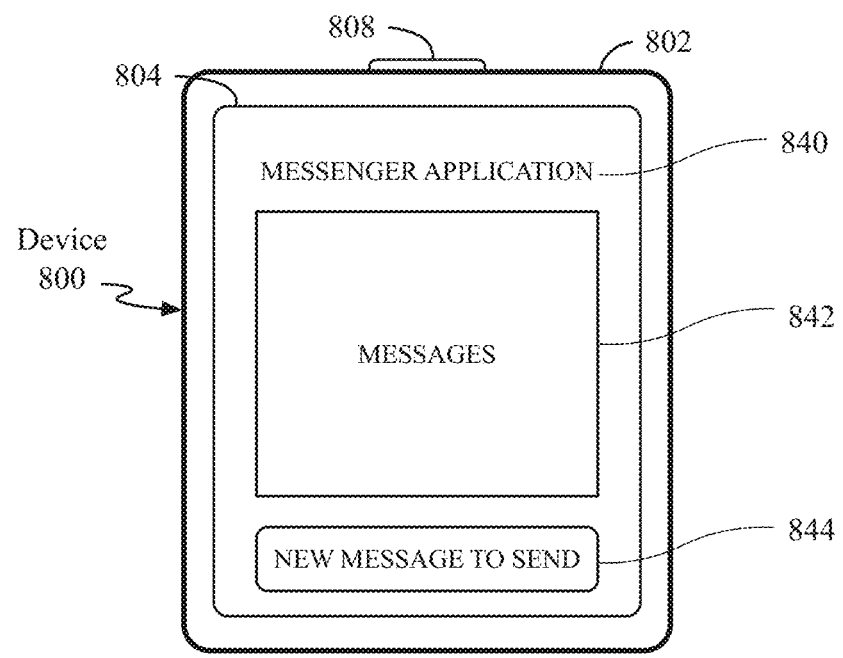

FIG. 8D illustrates a user interface 840 for an exemplary messenger application. User interface 840 for the messenger application can include a user interface region 842 in which received messages are displayed and an additional user interface region 844 in which messages to be sent are displayed. Messages to be sent can be entered via a keyboard displayed on the touchscreen display 804 of device 800, via voice input, or via remote input from another display device. Messages sent and received from device 800 can also be stored within cloud storage associated with the device.

Figure 8E:
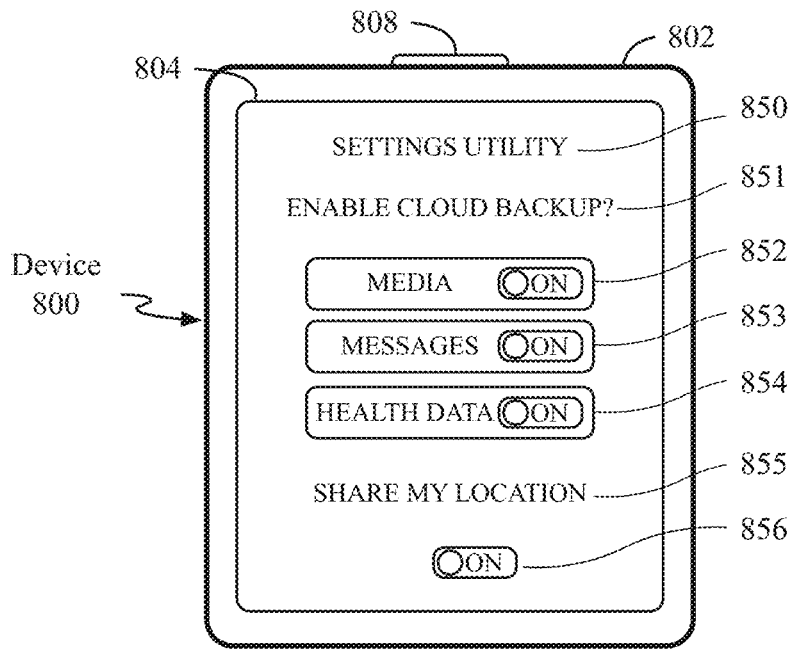

FIG. 8E illustrates a user interface 850 for a settings utility for an accessory device that is configured as primary device. The user interface 850 can include, for example, text 851 to indicate that cloud backup options can be configured on the device 800. In one embodiment, interface elements can be displayed to enable a user to configure backup options for locally stored media (interface element 852), messages (interface element 853), and/or health data (interface element 854). In one embodiment, messages may optionally be continually backed up via a cloud-based message delivery system that facilitates the receipt of the messages by the device 800.

In one embodiment, device 800 can be used to share a location for a user with family members or other users for which sharing has been enabled. The user interface 850 can include, for example, text 855 to indicate that location sharing can be configured for the device 800. A user interface element 856 can be presented to enable a user of device 800 to indicate whether the location of device 800 should be shared as the definitive location of the user. In one embodiment, device 800 can also include an application or user interface that enables the user of the device to see the location of other users (e.g., friends, family, co-workers, etc.) that are sharing their location with the user of device 800.

Figure 8F:
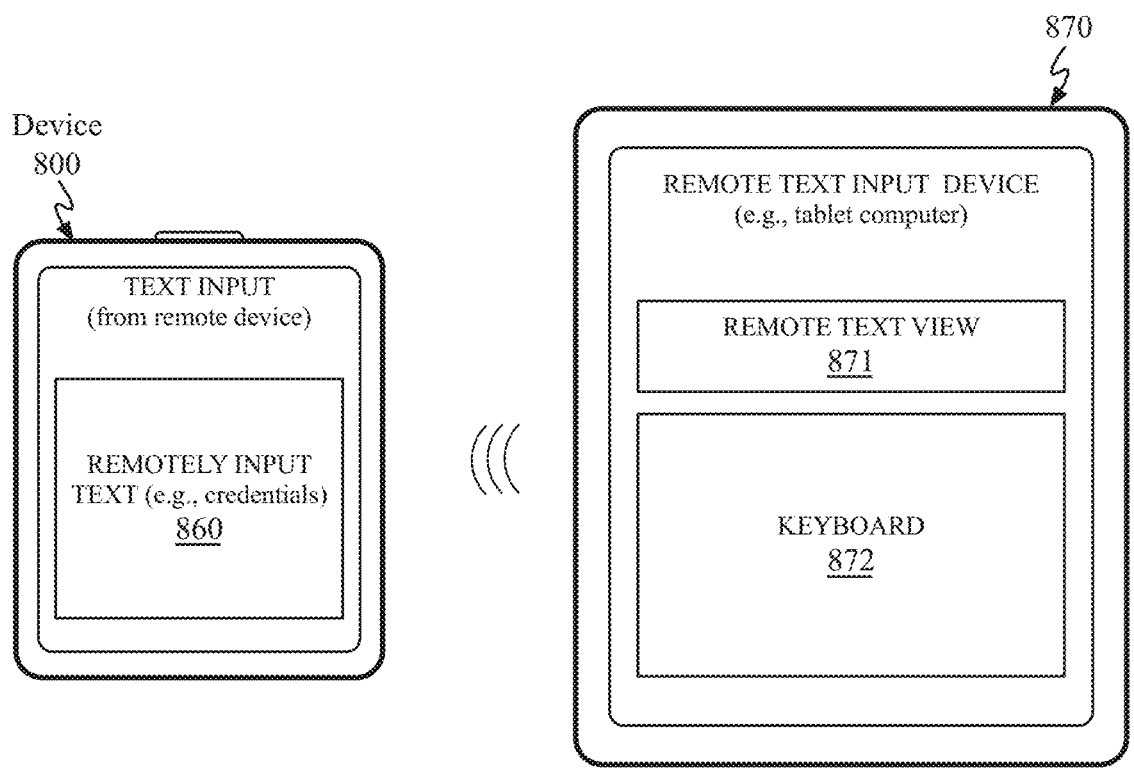

FIG. 8F illustrates a system in which text input for device 800 can be provided by a remote text input device 870, such as a tablet computer. In one embodiment a laptop or desktop computer can also be used as a remote input device. Remote text input can be enabled, for example, when credentials (e.g., username/password) are to be entered into device 800 and the device is located near an eligible potential remote text input device. A remotely input text region 860 of the user interface of device 800 can display text that is received from the remote text input device 870. In one embodiment, in addition to a software-based keyboard 872 that can be displayed on the user interface of the remote text input device 870, the user interface can also display a view 871 of the remote text that has been input by the remote text input device 870, for example if device 800 is a smartwatch or another device that may be difficult to view while in the act of entering remote text.

Synchronization of Data Between a Satellite and Management Device

Figure 9A:
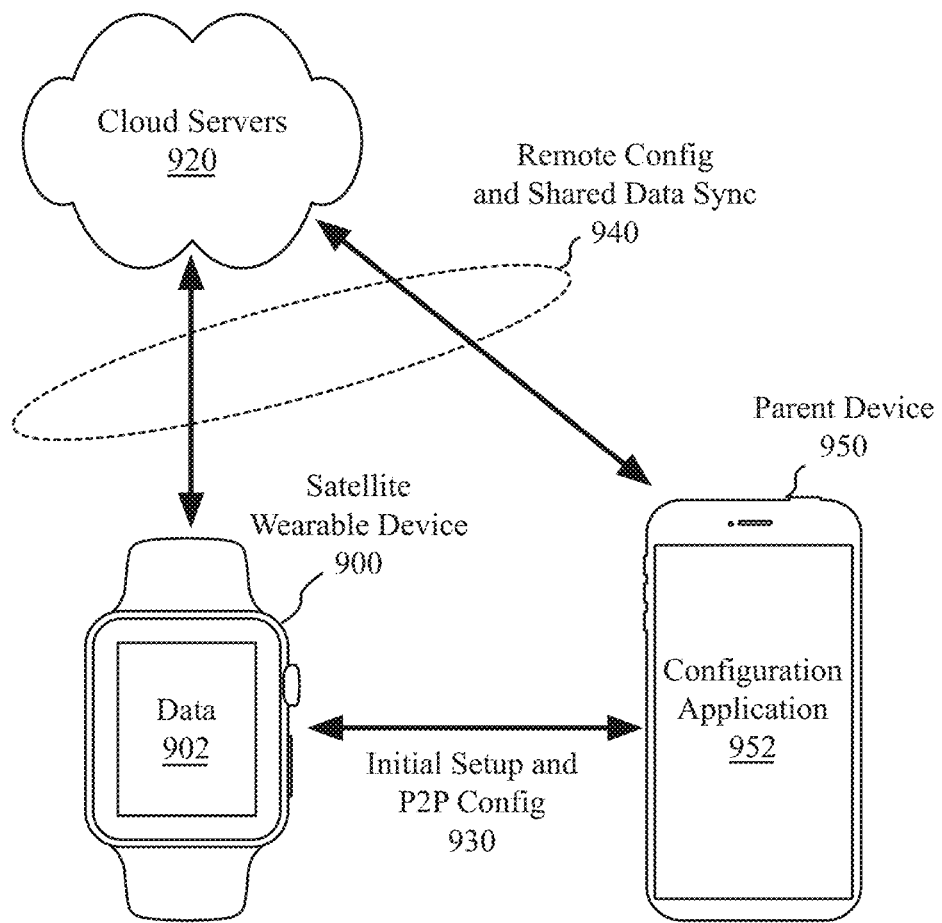
FIG. 9A-9B illustrate systems to synchronize data between a satellite accessory and a management device.
Figure 9B:
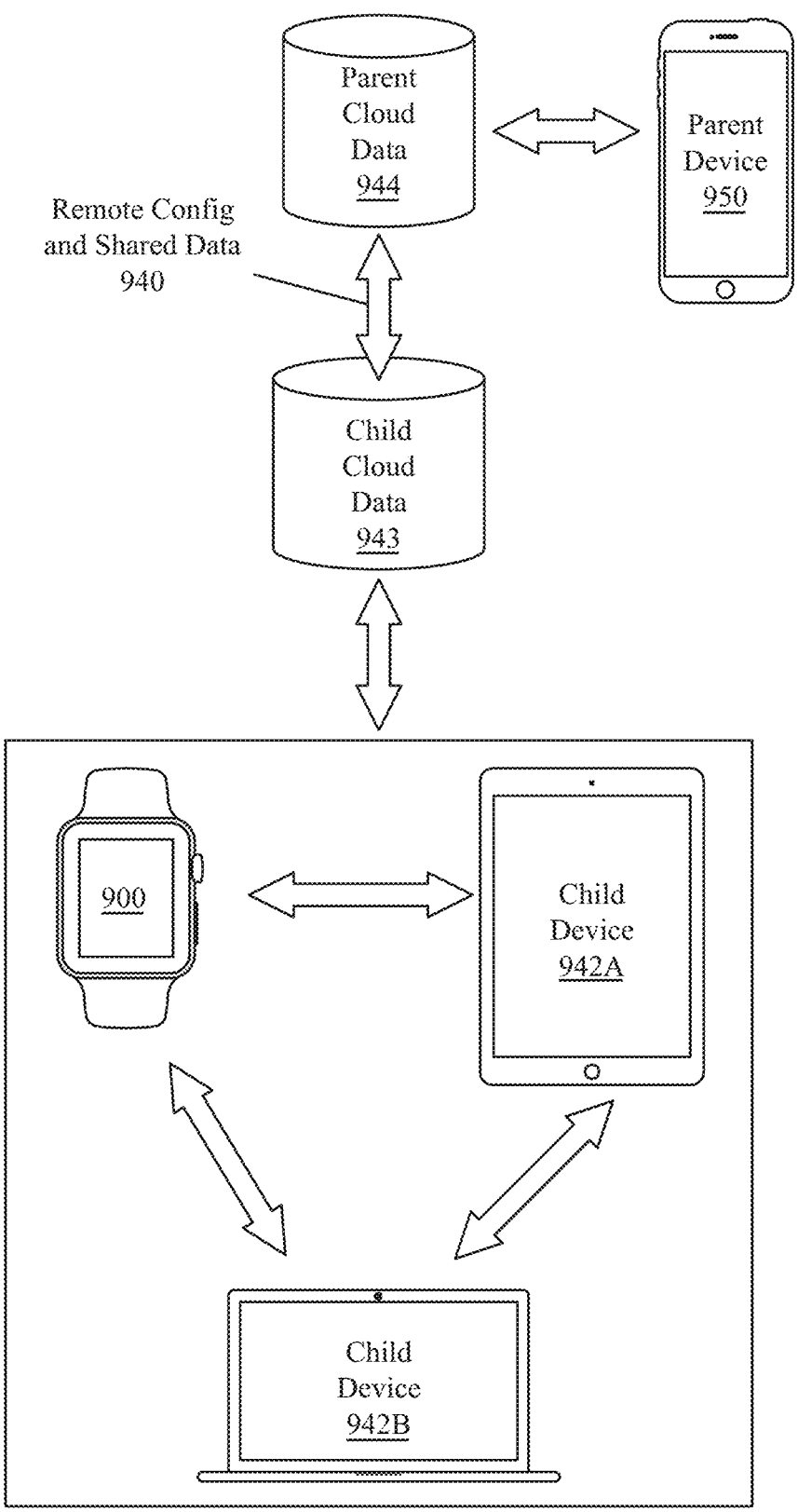

FIG. 9A-9B illustrate systems to synchronize data between a satellite accessory and a management device. Various data synchronization techniques can be applied in various embodiments. In some embodiments, data synchronization techniques can be applied at least in part as described in U.S. Provisional Patent Application No. 62/679,854, having the title "Data Synchronization Across Multiple Devices," to Joao Pedro De Almeida Forjaz de Lacerda, filed Jun. 3, 2018, which is incorporated by reference in its entirety to the extent that it is consistent with this disclosure.

As shown in FIG. 9A, a satellite wearable device 900 can be initially configured by a parent device 950 via a peer-to-peer wireless connection 930. Additionally, subsequent configuration of the satellite wearable device 900 can also be performed on a peer-to-peer basis. Remote configuration and shared data synchronization 940 can also be performed via a cloud communication channel established via a set of cloud servers 920. At least a subset of data 902 of a child user of the satellite wearable device 900 can be managed via a configuration application 952 on the parent device 950 using either a remote or peer-to-peer communication link. The data 902 of the satellite wearable device 900 can include shared data (e.g., calendar data, contacts, etc.) as well as configuration data for the satellite wearable device 900.

As shown in FIG. 9B, remote configuration and shared data synchronizing 940 can be performed via synched cloud data containers. One or more encrypted containers 944 that are used to store parent cloud data can be synchronized with a parent device 950. A subset of the data in the encrypted containers 944 storing parent cloud data can be synchronized with one or more encrypted containers 943 that are used to store child cloud data. Data within the one or more encrypted containers 943 that are used to store child cloud data can also be synchronized with one or more devices associated with a child account, including a satellite wearable device 900, as well as non-smartphone child devices 942A-942B associated with a child account, such as a tablet computer or a laptop computer.

In one embodiment, user data, such as health data gathered via sensors on the satellite wearable device 900, can be synchronized with the child devices 942A-942B using a peer to peer network connection or a cloud-based connection. The aggregate data can be synched with the parent device 950 as remote configuration and shared data via the cloud storage containers 943, 944. Such health data can include heartrate or motion data, such as activity or exercise data.

In one embodiment the encrypted storage containers 943, 944 that store data for the parent and child can include a subset of containers that are used specifically for sharing data between a parent device and a child device. Such containers may be encrypted using keys held only by the parent and child. The cloud storage provider will not retain access to those keys and thus will not be able to access data within such cloud storage containers.

Figure 10A:
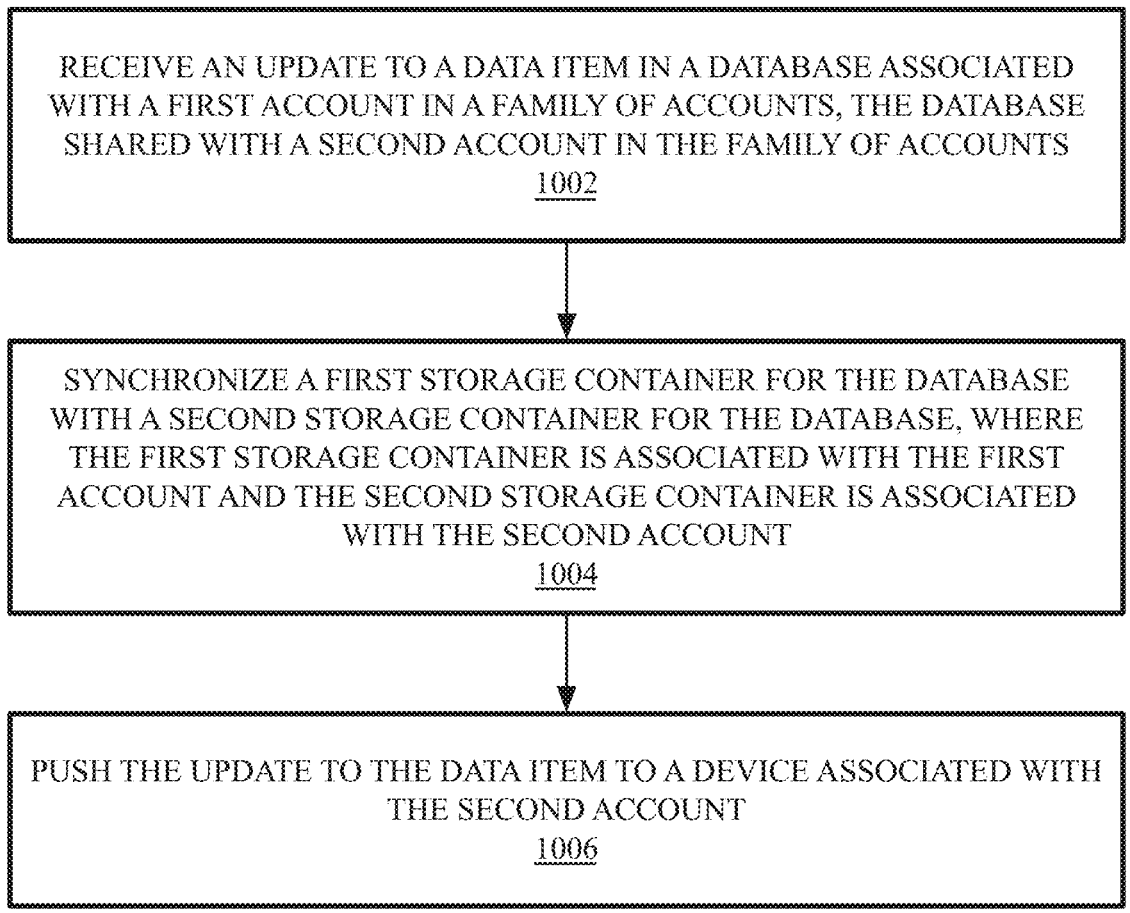
FIG. 10A-10B illustrate methods to synchronize data between a satellite accessory and a management device.
Figure 10B:
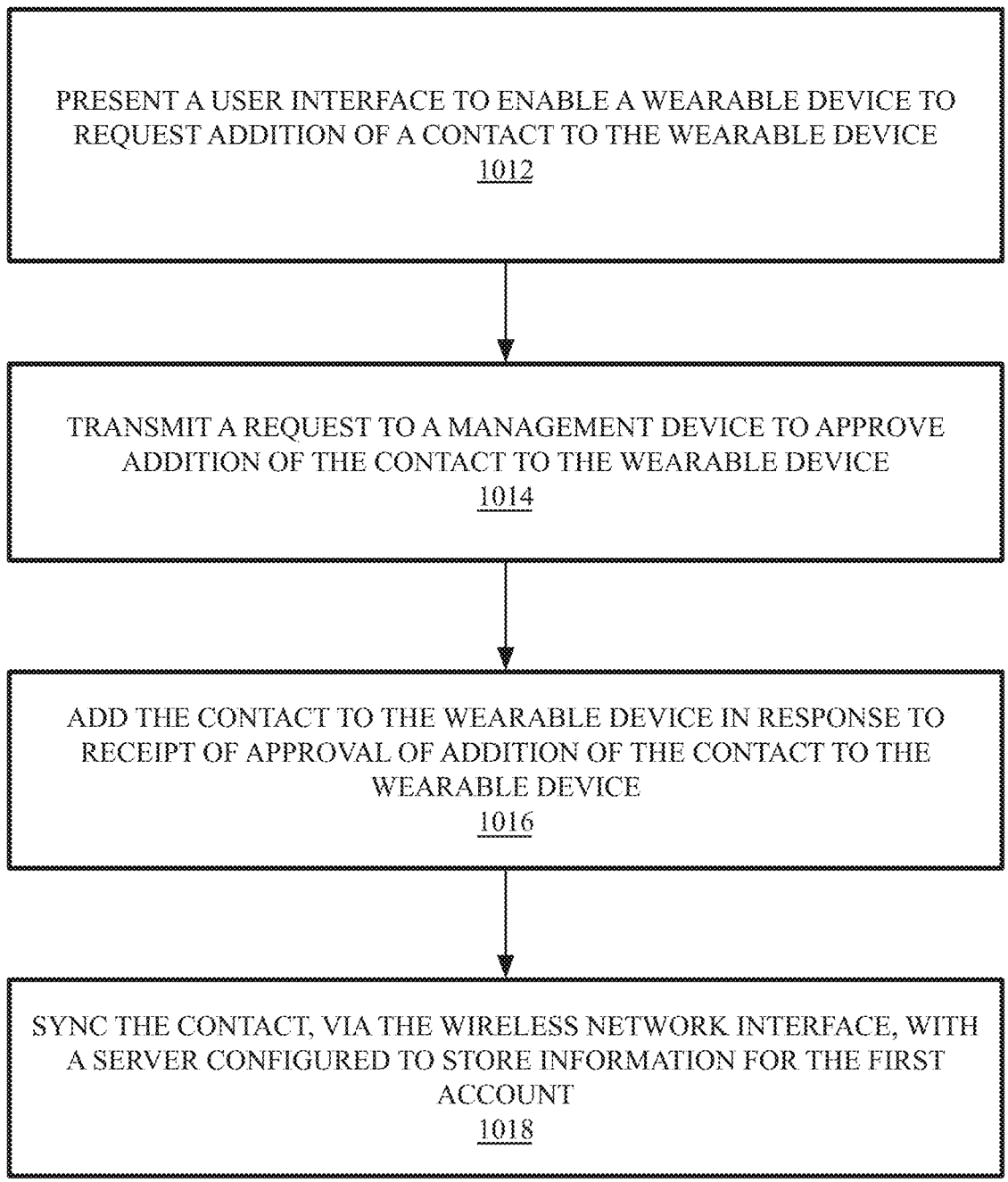

FIG. 10A-10B illustrate methods to synchronize data between a satellite accessory and a management device. FIG. 10A illustrates a method 1000 to update a data item in a database that is shared between parent and child user accounts within a family of user accounts. FIG. 10B illustrates a method 1010 to enabling a device associated with a parent account to approve the addition of a contact to be added to a device associated with a child account.

As shown in FIG. 10A, method 1000 includes for software logic to perform operations to receive an update to a data item in a database associated with a first account in a family of accounts, where the database is shared with a second account in the family of accounts (block 1002). Method 1000 additionally includes for software logic to synchronize a first storage container for the database with a second storage container for the database, where, the first storage container is associated with the first account and the second storage container is associated with the second account (block 1004). The software logic can then push the update to the data item to a device associated with the second account (block 1006).

Where the data item is a data item in a database in which bi-directional sharing is enabled, the first account can be an adult account or child account and the second account can also be a child account or an adult account. Where the data item is data to be pushed from a device associated with a parent account (e.g., parent smartphone) to a satellite device associated with a child account, the first account is a parent account and the second account is a child account associated with the satellite device.

As shown in FIG. 10B, method 1010 includes for software logic to perform operations to present a user interface to enable a wearable device to request addition of contact to the wearable device (1012). The wearable device can be associated with a first account within a group or family of associated accounts. The software logic can then transmit a request to a management device to approve addition of the contact to the wearable device (1014). In one embodiment the management device is associated with a second account within the group or family of the associated accounts. The software logic can then add the contact to the wearable device in response to receipt of approval of addition of the contact to the wearable device (1016). The software logic can then sync the contact, via the wireless network interface, with a server configured to store information for the first account (1018).

Software and Updates for Satellite and Management Devices

Figure 11A:
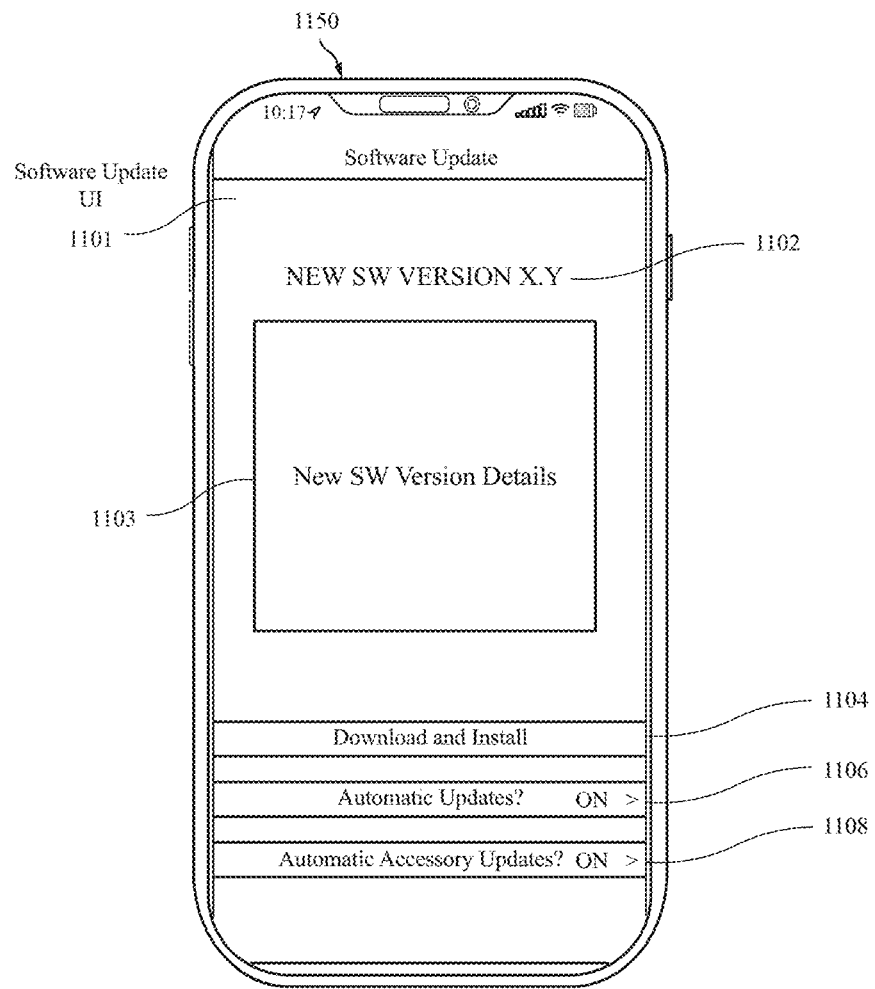
FIG. 11A-11C illustrate exemplary user interfaces to facilitate software updates on a satellite accessory.
Figure 11B:
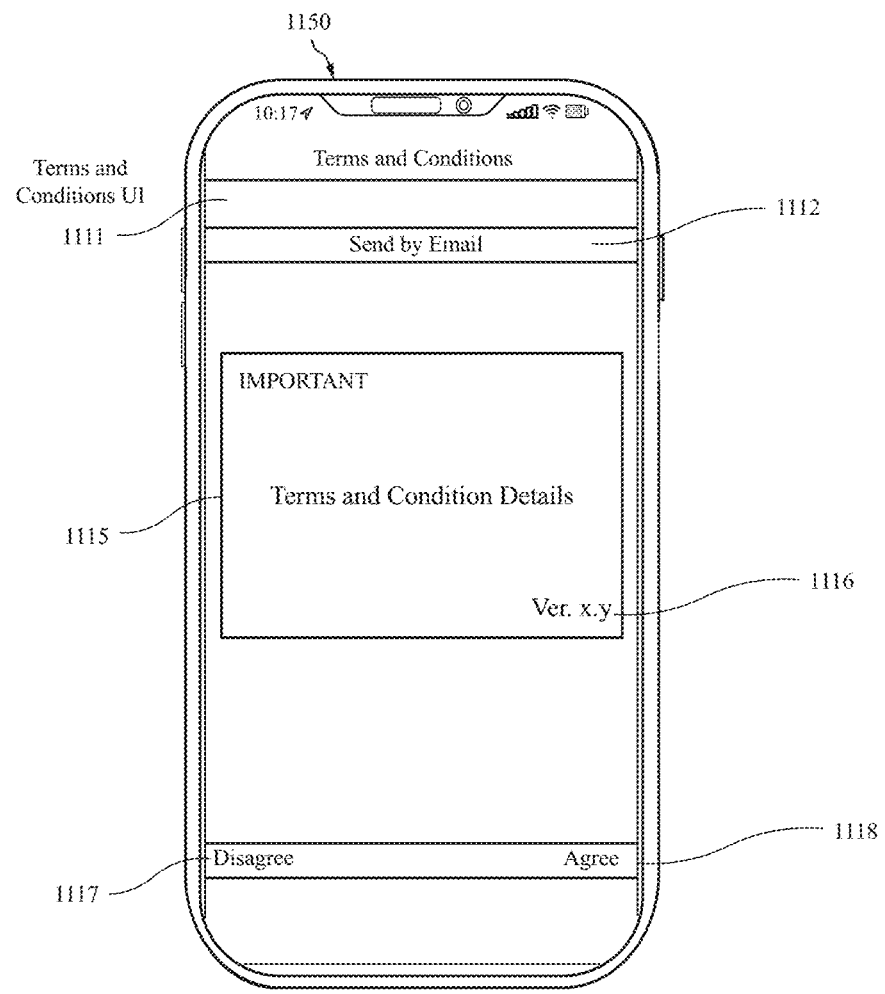
Figure 11C:
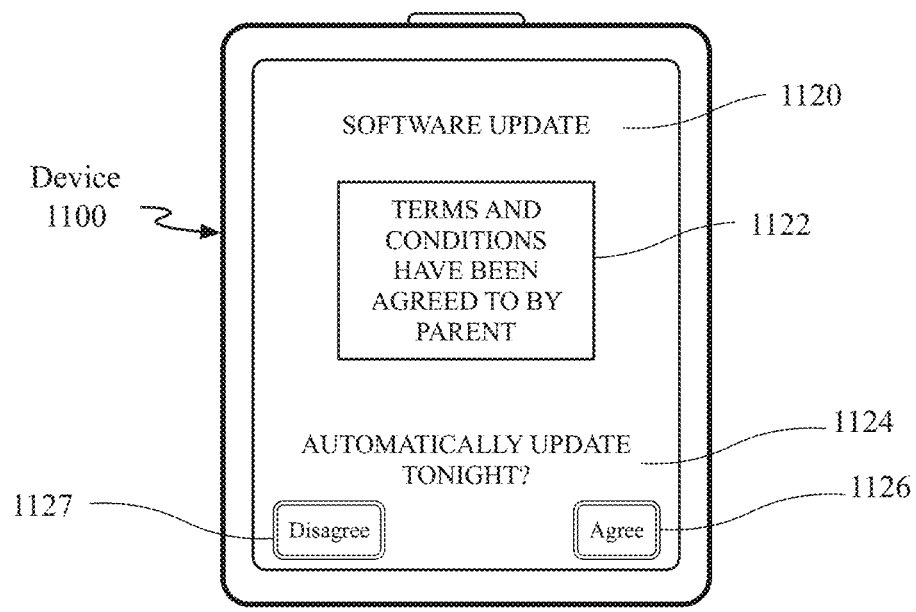

FIG. 11A-11C illustrate exemplary user interfaces to facilitate software updates on a satellite accessory. FIG. 11A shows a software update user interface for a management device. FIG. 11B shows a terms and conditions user interface for a management device. FIG. 11C shows a software update user interface on a satellite device.

As shown in FIG. 11A, an external device 1150, such as a management device for a satellite device, can periodically receive notices that an update to a new software version is available. The external device 1150 can present a software update user interface 1101 that presents information about the software update, including informational text 1102 about the new software version number and additional informational text 1103 with details about the software version, including changes, updates, or bug fixes that are included in the new version. The software update user interface 1101 can also include an interface element 1104 to enable the download and install of the software update, an interface element 1106 to enable or disable automatic updates on the external device 1150, and an interface element 1108 to enable or disable automatic updates on associated accessories, which can include a satellite accessory that is managed by the external device 1150.

As shown in FIG. 11B, a terms and conditions user interface 1111 can be presented by the external device in conjunction with performing a software update. The terms and conditions user interface 1111 can be presented for each software update or in response to a change in the version of the terms and conditions. In one embodiment, if a user has agreed to a version of the terms and conditions and a software update uses the same version of the terms and conditions, the display of the terms and conditions user interface 1111 may be bypassed. The terms and conditions user interface 1111 can include a scrollable window 1115 that displays terms and conditions details and a version number 1116 of the terms and conditions. The terms and conditions user interface 1111 can present an option to send the complete terms and conditions 1112 to the user via e-mail for review. User interface elements can also be presented to enable a user to disagree (interface element 1117) or agree (interface element 1118) with the terms and conditions.

As shown in FIG. 11C, device 1100, when configured as a satellite accessory of a child user, may present a software update user interface 1120 that displays informational text 1122 that indicates that the terms and conditions of a pending software update have been agreed to by a parent. In one embodiment, agreement to a version of the terms and conditions on a management device is applied to satellite accessories that are managed by the management device. In such embodiment, a user of a satellite accessory that is used as the primary device of a user will not be required to review the details of terms and conditions on the screen of the satellite accessory, which may be a relatively smaller screen compared to the screen of the management device. Thus, a user designated as a parent or guardian in a family of accounts may be allowed to agree to terms and conditions associated with software updates on behalf of a child user. In a similar fashion, a user designated as a manager of a group of enterprise accounts may be allowed to agree to terms and conditions associated with software updates on behalf of managed users. The software update user interface 1120 can present informational text 1124 indicating that device 1100 may be automatically updated at a later time (e.g., tonight) when device 1100 is placed on a charger. User interface elements can be presented to enable the user of device 1100 to disagree (interface element 1127) or agree (interface element 1126) to an automatic update to the new software version. The software update user interface 1120 may also display an option (not shown) to immediately update to the new software version, or to update to the new software version the next time device 1100 is placed on a charger. In one embodiment the software update user interface 1120 will not be shown unless the available software update is compatible with software on the management device that enables the parent to manage or configure device 1100.

In embodiments described herein, where parent and child accounts and/or parent and child devices are described, similar techniques can also be applied to enterprise employee accounts or devices that are managed accounts or devices. Furthermore, operations regarding a family of related accounts may be equivalent to operations regarding a group of enterprise accounts.

Figure 12:
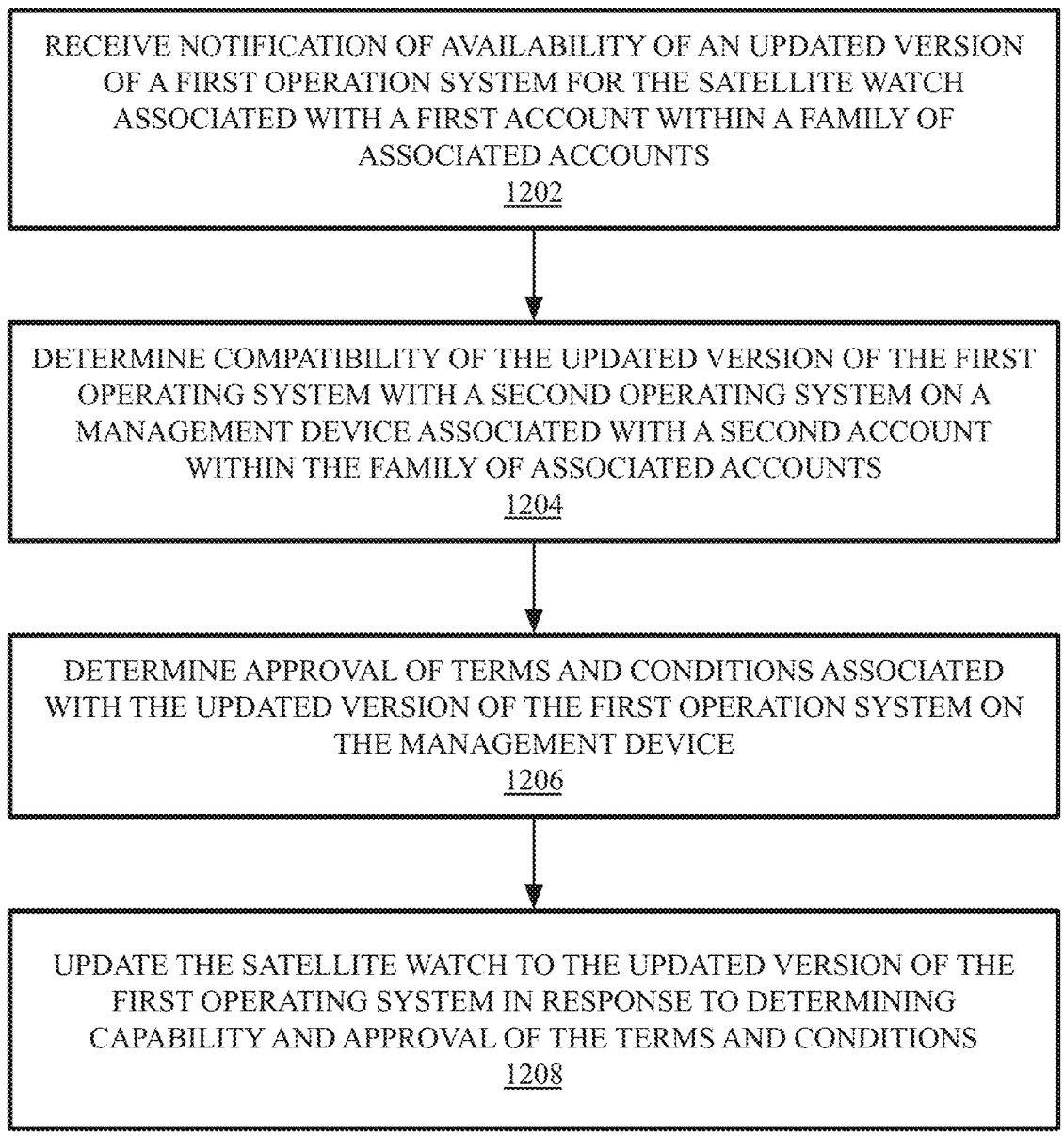
FIG. 12 illustrate a method to perform software updates on a satellite accessory.

FIG. 12 illustrate a method 1200 to perform software updates on a satellite accessory. The satellite accessory can be, for example, a satellite watch of a child user, although method 1200 can be used for other types of accessory devices.

In one embodiment, method 1200 includes for software on the satellite watch to perform operations to receive notification of availability of an updated version of a first operation system for the satellite device, which is a wearable electronic device associated with a first account within a family of associated accounts (block 1202).

The satellite watch is managed by a management device associated with a second account within the family of accounts. The satellite accessory can then determine compatibility of the updated version of the first operating system with a second operating system on the management device (block 1204). Software updates for satellite watch can also be limited to those versions of the software that are compatible with software on the management device. Compatible versions are those versions that will not break the communication link between the management device and the satellite watch.

The satellite watch can then determine approval of terms and conditions associated with the updated version of the first operation system on the management device (block 1206). The satellite watch can then enable the update to the updated version of the first operating system in response to determining capability and approval of the terms and conditions (block 1208).

Peer to Peer Configuration of Satellite Devices

Figure 13A:
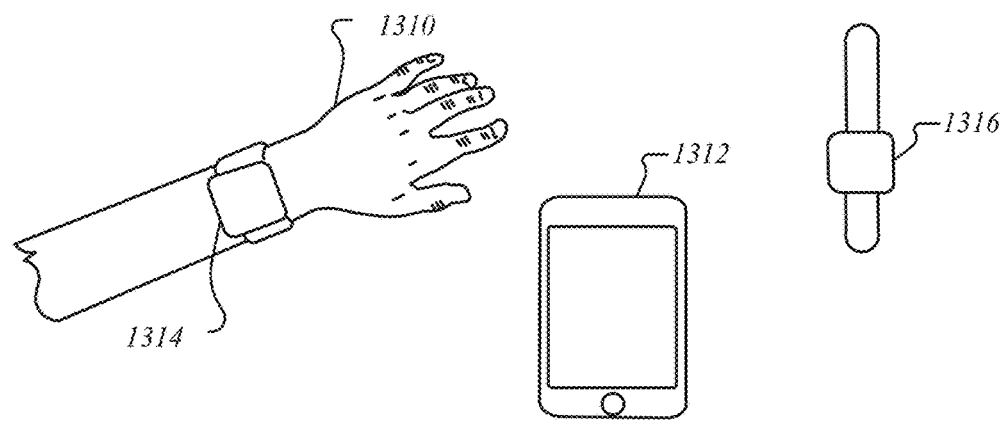
FIG. 13A-13C illustrate a system to enable peer-to-peer configuration of a satellite accessory.
Figure 13B:
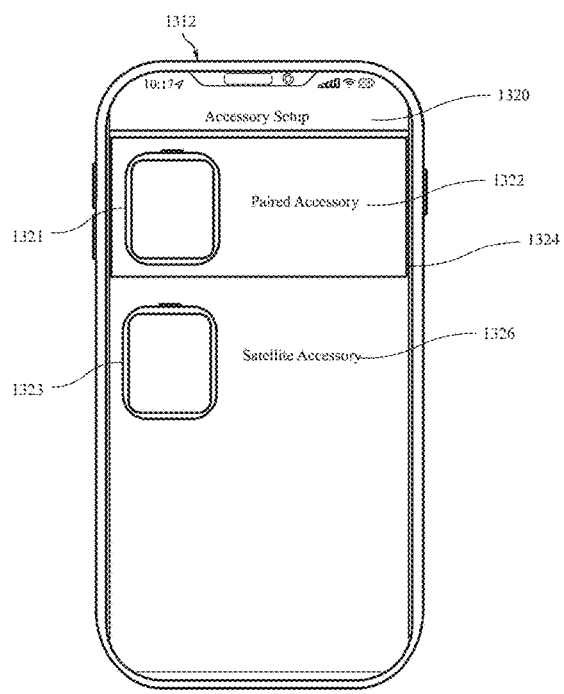
Figure 13C:
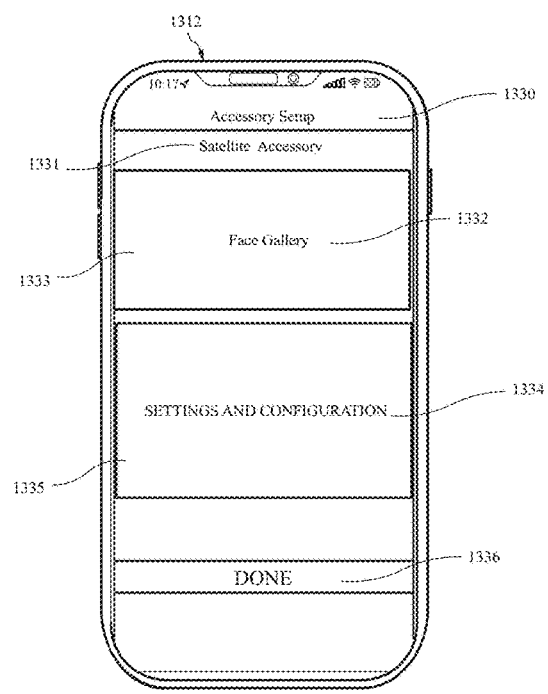

FIG. 13A-13C illustrate a system to enable peer-to-peer configuration of a satellite accessory. FIG. 13A shows wearable devices that can be managed using a peer-to-peer wireless connection with a management device. FIG. 13B shows an accessory setup application that enables selection between a paired accessory and satellite accessory. FIG. 13C shows an accessory setup application that can be used to manage a satellite accessory.

As shown in FIG. 13A, a peer-to-peer configuration system can enable a user 1310, such as a user associated with a parent or guardian account, to switch between management of an accessory device 1314 of the user 1310 and a satellite accessory device 1316. A management device 1312 of the parent or guardian can be paired with accessory device 1314 and maintain a persistent connection with the accessory device. By default, the management application on the management device may be configured to adjust settings and configurations of accessory device 1314. In one embodiment, the management application can also display an option to adjust settings and configuration of satellite accessory device 1316. Satellite accessory device 1316 need not be worn by the user 1310 or unlocked to enable management via the management application, although adjustment of some settings may be limited if satellite accessory device 1316 is unlocked. Where satellite accessory device 1316 is configured to re-lock after a period of time if not attached to a user's wrist, in one embodiment such feature may be disabled while satellite accessory device 1316 is being managed by management device 1312. Alternatively, satellite accessory device 1316 may remain attached to the user of the satellite accessory while being managed by management device 1312. An exemplary management application is shown in FIG. 13B-13C. The management application can be an accessory setup application that can be used to manage a paired or satellite accessory.

As shown in FIG. 13B, the accessory setup application can present an accessory setup user interface 1320 that enables selection between a paired accessory and satellite accessory. In one embodiment, the paired accessory can be the accessory device 1314 of the user 1310 associated with a parent account. Accessory device 1314 can be designated in the accessory setup user interface 1320 via an interface element 1321 with a label 1322 indicating the accessory as a paired accessory. The accessory setup user interface 1320 can also include a user interface feature 1324 (e.g., box, highlight, etc.) that indicates that the paired accessory is the selected or default accessory to be managed. The accessory setup user interface 1320 can also present an interface element 1323 with a label 1326 indicating the optional ability to manage a satellite accessory.

In one embodiment the interface element 1323 to select the satellite accessory for management can be displayed by the manage the accessory setup user interface 1320 when the satellite accessory is detected to be within wireless range of the management device 1312. In one embodiment, the interface element 1323 can be displayed but indicated as unelectable (e.g., greyed out) unless the satellite accessory is within wireless range. When the interface element 1323 for the satellite accessory is selected for management, the management device 1312 can establish a secure and encrypted wireless connection with the satellite accessory. In one embodiment the management device 1312 may disconnect from the paired accessory while managing the satellite accessory.

As shown in FIG. 13C, an additional accessory setup user interface 1330 can be presented when a satellite accessory is selected for management. The accessory setup user interface 1330 that is presented to manage the satellite accessory may be similar to the interface that would be presented to manage the paired accessory or may include features that are specific to management of a satellite accessory. The accessory setup user interface 1330 can include a label 1331 indicating the accessory that is being managed, a first interface region 1333 including a face gallery 1332 for selecting a face to be displayed on the satellite accessory, and a second interface region 1335 that includes settings and configurations 1334 that can be modified for the satellite accessory. The accessory setup user interface 1330 can also include an interface element 1336 that enables a user to terminate management of the satellite accessory. In one embodiment, when the user terminates management of the satellite accessory, the accessory setup application returns to accessory setup user interface 1320 and re-selects the paired accessory. The management device 1312, in response to termination of management of the satellite accessory, may automatically reconnect to the paired accessory. In one embodiment, accessory setup user interface 1330 may timeout after a period of time when no input is received, automatically returning to accessory setup user interface 1320 and/or automatically reconnecting to the paired accessory.

Figure 14:
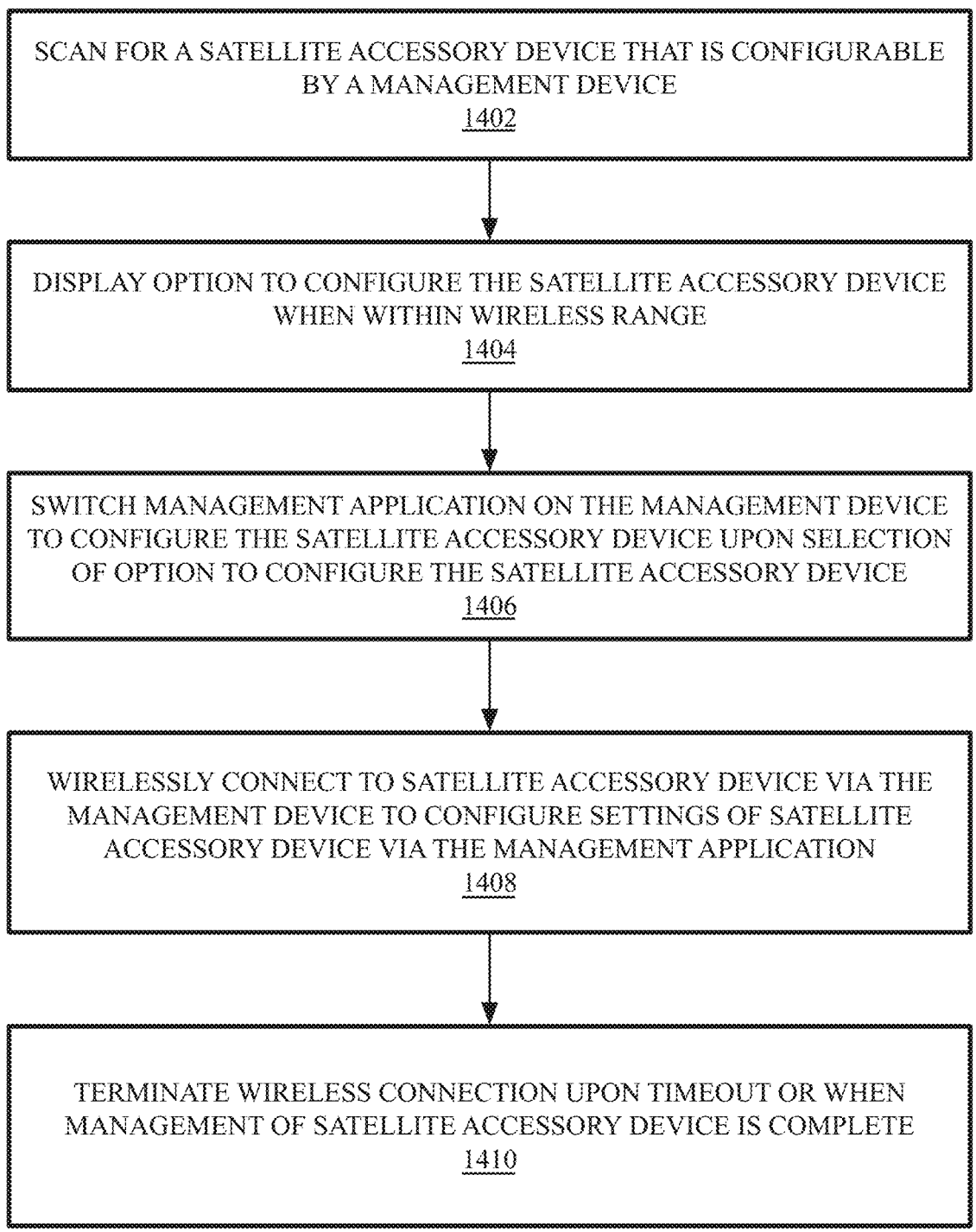
FIG. 14 illustrates a method of performing peer-to-peer configuration of a satellite accessory.

FIG. 14 illustrates a method 1400 of performing peer-to-peer configuration of a satellite accessory. Method 1400 includes operations to scan for a satellite accessory device that is configurable by a management device (block 1402). When the satellite accessory device is within wireless range of the management device, the management device can display an option on a display of the management device to configure the satellite accessory device (block 1404).

The management device can switch a management application on the management device to configure the satellite accessory device upon selection of option to configure the satellite accessory device (block 1406). The management device can wirelessly connect to the satellite accessory device to enable configurations of the settings of the satellite accessory device via the management application (block 1408). The management device can then terminate the wireless connection upon a timeout or when management of satellite accessory device is complete (block 1410). If the management device is associated with a wearable accessory, the management application can automatically switch back to managing a wearable accessory that is associated with the management device. If the management device is not associated with a wearable accessory, the management device can switch to a NULL accessory.

Hardware Updates for Satellite and Management Devices

Figure 15:
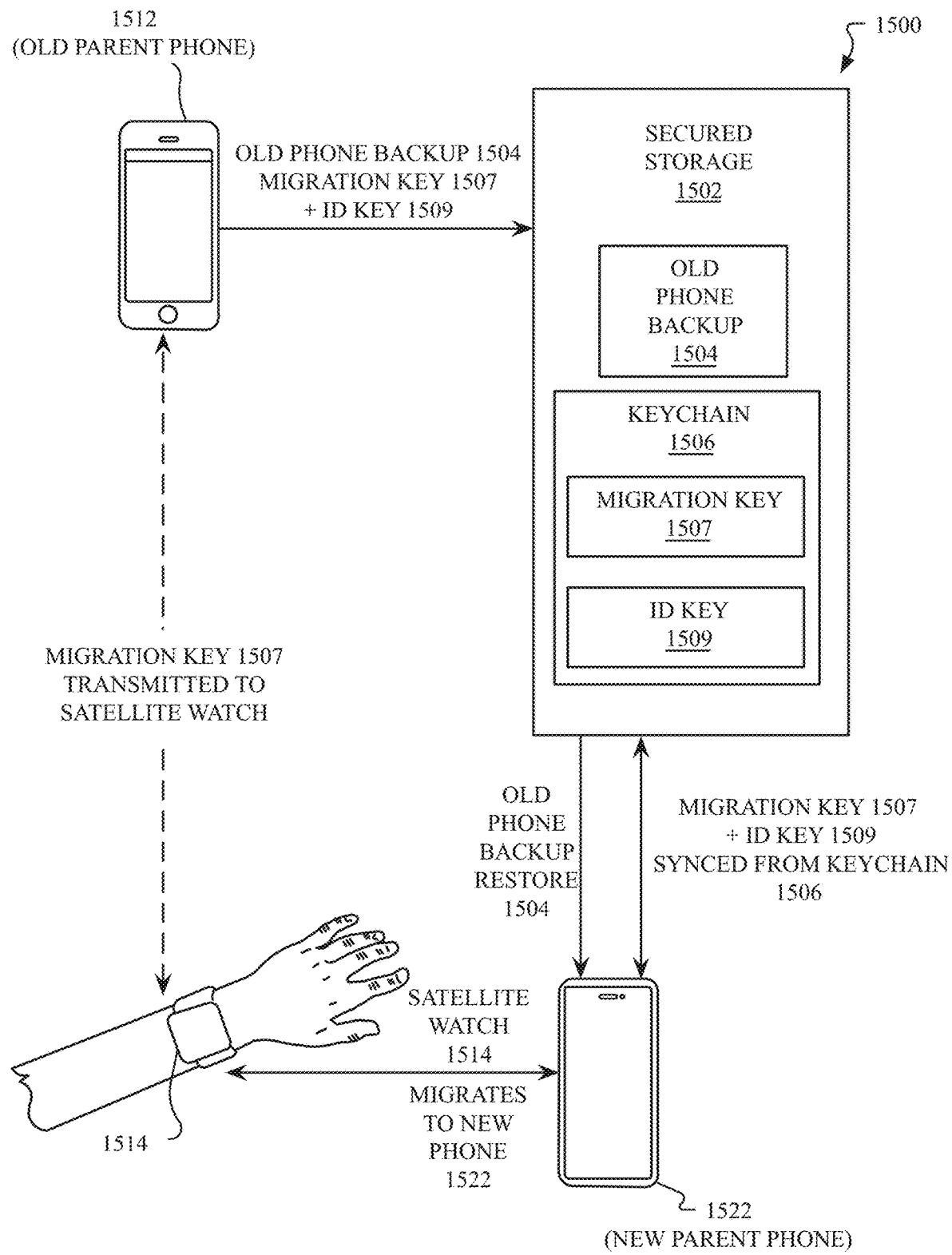
FIG. 15 illustrates a migration architecture that enables the upgrade of hardware of a management device associated with a satellite accessory.

FIG. 15 illustrates a migration architecture 1500 that enables the upgrade of hardware of a management device associated with a satellite accessory. In one embodiment a management relationship between a satellite watch 1514 and a management device (old parent phone 1512) can be migrated to new management device (new parent phone 1522) during a hardware upgrade process. Migration can be facilitated via secured storage 1502, which can be associated with cloud storage provided by a cloud storage provider. In one example, satellite watch 1514 is an Apple watch, new parent phone 1522 and old parent phone 1512 are iPhones, and secured storage 1502 can be iCloud or iTunes secured storage, although embodiments are not limited as such.

Migration architecture 1500 and the techniques and examples disclosed herein can implement the techniques, examples, embodiments, methods and operations disclosed in U.S. patent application Ser. No. 14/871,484 having the title "Backup Accessible By Subset of Related Devices," filed on Sep. 20, 2015; U.S. patent application Ser. No. 14/872,532 having the title "Data Protection for Keychain Syncing," filed on Aug. 17, 2015; and U.S. patent application Ser. No. 15/273,414 having the title "Switching Between Watches or Other Accessories," filed on Aug. 17, 2015, which are all incorporated herein by reference and commonly assigned.

Satellite watch 1514 can implement hardware-encrypted storage and class-based protection of files and keychain items. For the migration techniques disclosed herein, satellite watch 1514 can be unlocked or locked, e.g., unlocked by entering a passcode or locked with no passcode entered. Data that enables the management of the satellite watch 1514 by the old parent phone 1512 can be migrated to new parent phone 1522 using migration key 1507 and ID key 1509 as part of keychain 1506. ID key 1509 allows new parent phone 1522 to discover or detect the satellite watch 1514, which enables the new parent phone 1522 to perform peer-to-peer management of the satellite watch 1514. Migration key 1507 is synced between the devices to enable shared data and configuration information associated with the satellite watch 1514 to be migrated to the new parent phone 1522. Migration key 1507 can be transmitted to the satellite watch 1514 via a peer-to-peer data connection if the old parent phone 1512 and the satellite watch are in proximity. Migration key 1507 can also be transmitted to the satellite watch 1514 via shared cloud storage containers. In one embodiment, a portion of keychain 1506 can be shared between parent and child user accounts. In such embodiment the migration key 1507 can be synchronized via the shared portion of keychain 1506.

Keychain 1506 is a locked and encrypted container including private, sensitive, and confidential data such as account names and passwords or security keys for applications, servers, websites, and cloud services and accounts. Keychain 1506 can also store confidential information such as credit card numbers and information and personal identification numbers (PINs) for bank accounts and other personal accounts. Keychain 1506 allows safe and secured storage of account names, passwords, security keys, credit card numbers and information, etc. on user approved devices. Keychain 1506 can be used to store migration key 1507 and ID key 1509 but can also store other information and keys not shown. In one example, migration key 1507 can be used by new phone 1522 to detect, determine, or verify if satellite watch 1514 is associated with migration key 1507, and, in such a case, migration can proceed from satellite watch 1514 to new phone 1522. ID key 1509 can be used to identify and communicate with satellite watch 1514.

In one example, migration key 1507 can be any type of encryption/decryption key, e.g., an Advanced Encryption Standard (AES) key used to encrypt and decrypt data or content. And, in one example, ID key 1509 can be an Identity Resolution Key, which is a Bluetooth encryption key, used by a first device to encrypt a random medium access control (MAC) address of the first device and used by a second device to identify the real MAC address of the first device and communicate with it. In one example, new phone 1522 can detect ID key 1509 of satellite watch 1514 advertising over Bluetooth. Satellite watch 1514 and new parent phone 1522 can communicate over secured and encrypted communication channels established via Bluetooth to determine if migration can proceed. Migration can occur without having a user re-validate the satellite watch 1514 during initial pairing with new phone 1522, e.g., by optically scanning a code on satellite watch 1514 by new parent phone 1522, using an NFC tap, or entering a PIN, allowing migration to be performed without any potential loss of data on the satellite watch 1514.

In one embodiment, after old parent phone 1512 stores an old phone backup 1504 in secured storage 1502. The user can upgrade to new parent phone 1522, which can be a newer hardware version or a replacement phone of the same hardware version as the old parent phone 1512. During setup of new parent phone 1522, the user is prompted to restore a backup of old phone 1512 from secured storage 1502 using user credentials for old phone 1512 to authenticate the user. In one embodiment, two-level or two-factor authentication (2FA) can be used to authenticate the user of new parent phone 1522 to restore old phone backup 1504 from old new phone 1512. The migration key 1507 and ID key 1509 can be synched to the new parent phone 1522 via keychain 1506. ID key 1509 can then be used to enable new parent phone 1522 to discover or detect the satellite watch 1514. Migration key 1507 can be used to enable the migration of shared data and configuration information associated with the satellite watch 1514 to the new parent phone 1522.

Figure 16:
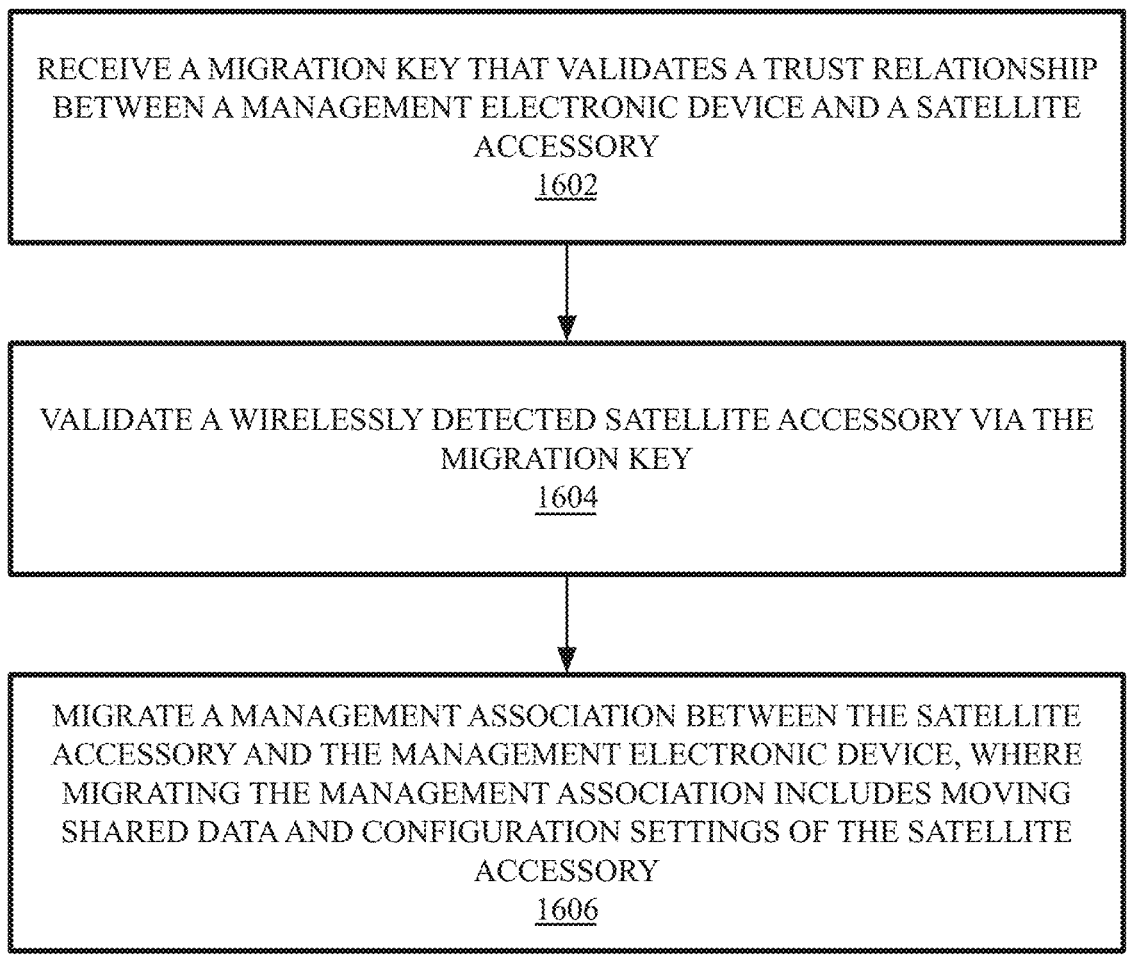
FIG. 16 illustrates a method to enable hardware upgrade of a management device associated with a satellite accessory.

FIG. 16 illustrates a method 1600 to enable hardware upgrade of a management device associated with a satellite accessory. The satellite accessory can be a wearable device as described herein, such as but not limited to a smartwatch device. Method 1600 can be implemented using the migration architecture 1500 of FIG. 15. Method 1600 includes for software on a new management device to receive a migration key that validates a trust relationship between a management electronic device and a satellite accessory (block 1602). The new management device can then validate a wirelessly detected satellite wearable device via the migration key (block 1604). The new management device can then migrate a management association between the satellite wearable device and the management electronic device, where migrating the management association includes moving shared data and configuration settings of the satellite wearable device (block 1606). The migration key can be received at the new management electronic device via a keychain that includes key data that was received from the old management device.

Figure 17:
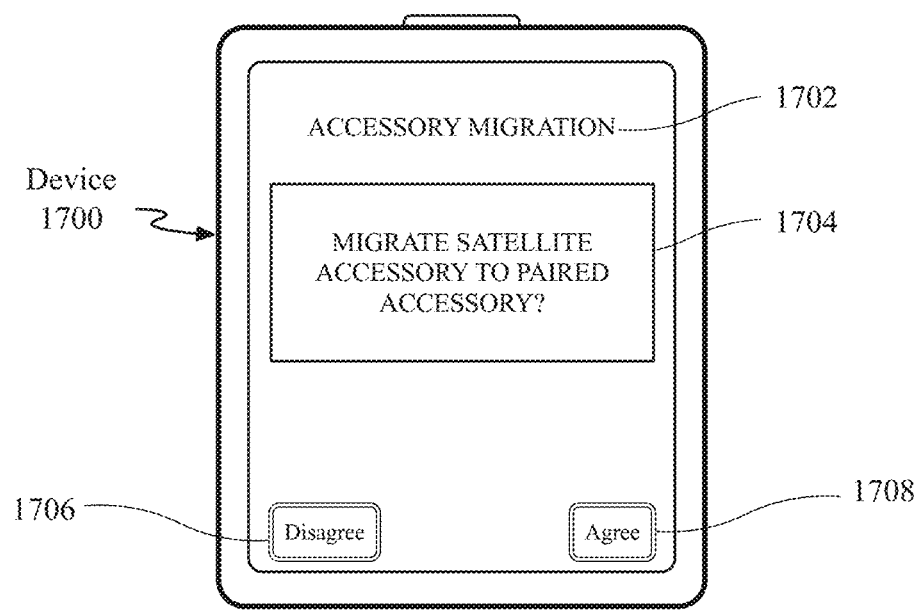
FIG. 17 illustrates a system to enable transition of a satellite accessory to a paired accessory of a companion device.

FIG. 17 illustrates a system to enable transition of a satellite accessory to a paired accessory of a companion device. A device 1700 that is configured as a satellite accessory may be used as a primary device of a user, such as a minor-aged user that does not have persistent ownership, possession, or control of a smartwatch to use as a companion device for the satellite accessory. If the user subsequently acquires a smartphone device or another device that can be used as a companion device, the user may wish to pair the satellite accessory with the smartphone device. In one embodiment, device 1700 may be required to be reset and paired with the new companion device as shown in FIG. 3A-3C and FIG. 4A-4C. In one embodiment, the user may instead be presented with an accessory migration user interface 1702.

The accessory migration user interface 1702 can present informative text 1704 that presents the user with the option to disagree (interface element 1706) or agree (interface element 1708) with the prompt to migrate the satellite accessory to a paired accessory. If the user agrees to the prompt, the device 1700 will be transitioned to a paired device of the smartphone device of the user. The migration can be enabled using identification keys that at least quasi-uniquely identify device 1700 and a smartphone to which device 1700 is to be paired. The identification keys can allow device 1700 and the smartphone to mutually identify and validate each other before a pairing process occurs. In one embodiment the migration can be performed without a resetting and restoring device 1700 and without performing the pairing operations shown in FIG. 4A-4C.

Figure 18:
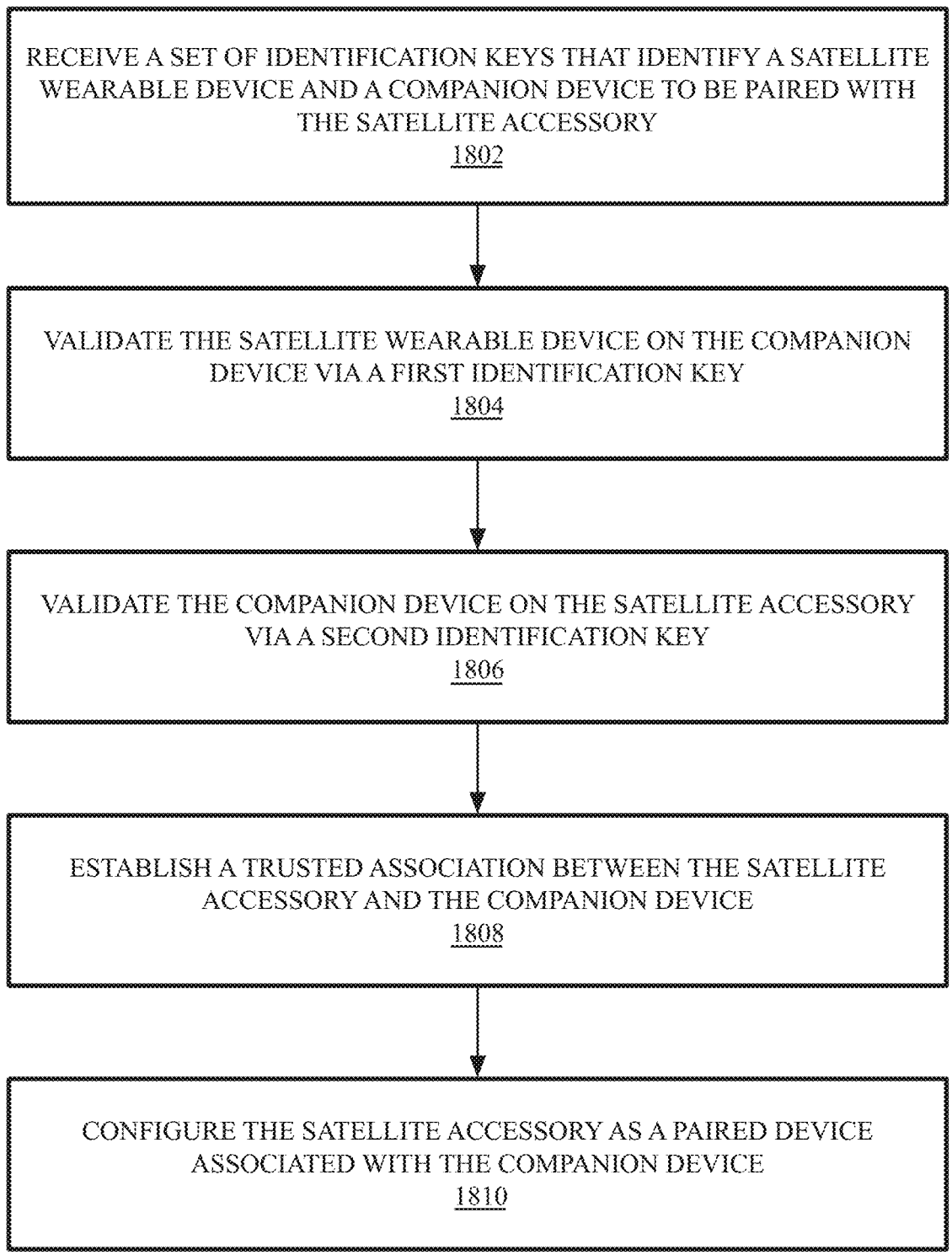
FIG. 18 illustrates a method to enable transition of a satellite accessory to a paired accessory of a companion device.

FIG. 18 illustrates a method 1800 to enable transition of a satellite accessory to a paired accessory of a companion device. For example, a satellite accessory (e.g., satellite watch, etc.) of a user can be transitioned from a primary device to a secondary device by pairing the wearable device with a new smartphone device of the user. In one embodiment, method 1800 includes for the satellite accessory and the potential companion device to be paired with the satellite accessory to each to receive a set of identification keys that identify the satellite wearable device and the companion device (block 1802). The companion device can validate the satellite accessory via a first identification key (block 1804). The satellite accessory can validate the companion device via a second identification key (block 1806). Upon validation, an established trust relationship can be established between the satellite accessory and the companion device (block 1808). The satellite accessory can then be configured as a paired device of the companion device (block 1810).

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Additional Exemplary Device Architectures

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

Figure 19:
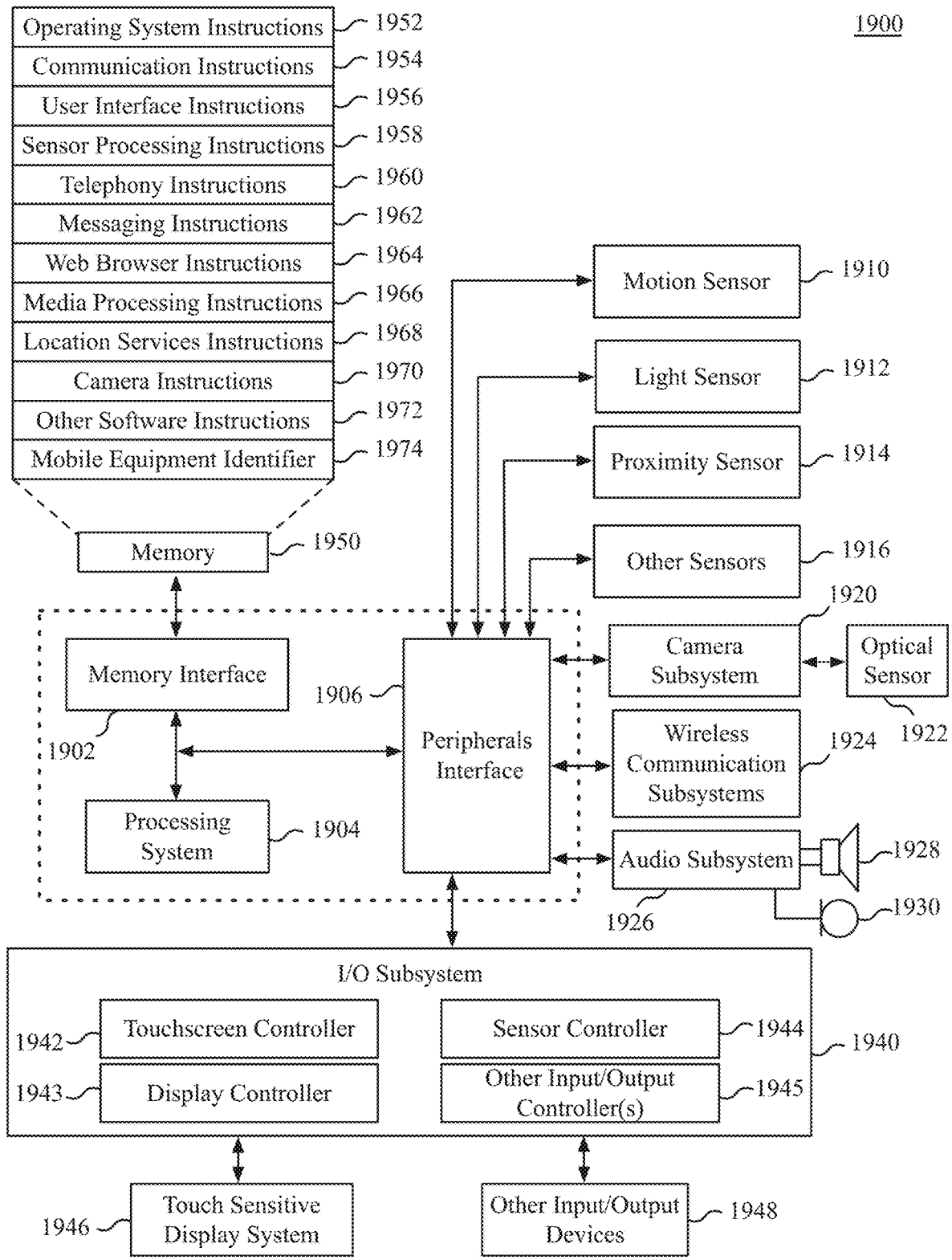
FIG. 19 is a block diagram of mobile device architecture, according to an embodiment.

FIG. 19 is a block diagram of mobile device architecture 1900, according to an embodiment. The mobile device architecture 1900 includes a memory interface 1902, a processing system 1904 including one or more data processors, image processors and/or graphics processing units, and a peripherals interface 1906. The various components can be coupled by one or more communication buses or signal lines. The various components can be separate logical components or devices or can be integrated in one or more integrated circuits, such as in a system on a chip integrated circuit.

The memory interface 1902 can be coupled to memory 1950, which can include high-speed random-access memory such as static random-access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1906 to facilitate multiple functionalities. For example, a motion sensor 1910, a light sensor 1912, and a proximity sensor 1914 can be coupled to the peripherals interface 1906 to facilitate the mobile device functionality. Other sensors 1916 can also be connected to the peripherals interface 1906, such as a positioning system (e.g., GPS receiver), a temperature sensor, a biometric sensor, or other sensing device, to facilitate related functionalities. A camera subsystem 1920 and an optical sensor 1922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1924, which can include radio frequency receivers and transmitters and/or optical (e.g., infrared) receivers and transmitters. The specific design and implementation of the wireless communication subsystems 1924 can depend on the communication network(s) over which a mobile device is intended to operate. For example, a mobile device including the illustrated mobile device architecture 1900 can include wireless communication subsystems 1924 designed to operate over a GSM network, a CDMA network, an LTE network, a Wi-Fi network, a Bluetooth network, or any other wireless network. In particular, the wireless communication subsystems 1924 can provide a communications mechanism over which a client browser application can retrieve resources from a remote web server.

An audio subsystem 1926 can be coupled to a speaker 1928 and a microphone 1930 to facilitate voice-enabled functions, such as voice recognition, voice replication, digital recording, and telephony functions.

The I/O subsystem 1940 can include a touchscreen controller 1942 and/or other input controller(s) 1945. The touchscreen controller 1942 can be coupled to a touch sensitive display system 1946 (e.g., touchscreen). The touch sensitive display system 1946 and touchscreen controller 1942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1946. Display output for the touch sensitive display system 1946 can be generated by a display controller 1943. In one embodiment the display controller 1943 can provide frame data to the touch sensitive display system 1946 at a variable frame rate.

In one embodiment a sensor controller 1944 is included to monitor, control, and/or processes data received from one or more of the motion sensor 1910, light sensor 1912, proximity sensor 1914, or other sensors 1916. The sensor controller 1944 can include logic to interpret sensor data to determine the occurrence of one of more motion events or activities by analysis of the sensor data from the sensors.

In one embodiment the I/O subsystem 1940 includes other input controller(s) 1945 that can be coupled to other input/control devices 1948, such as one or more buttons, rocker switches, thumb-wheel, infrared port, USB port, and/or a pointer device such as a stylus, or control devices such as an up/down button for volume control of the speaker 1928 and/or the microphone 1930.

In one embodiment, the memory 1950 coupled to the memory interface 1902 can store instructions for an operating system 1952, including portable operating system interface (POSIX) compliant and non-compliant operating system or an embedded operating system. The operating system 1952 may include instructions for handling basic system services and for performing hardware dependent tasks. In some implementations, the operating system 1952 can be a kernel.

The memory 1950 can also store communication instructions 1954 to facilitate communicating with one or more additional devices, one or more computers and/or one or more servers, for example, to retrieve web resources from remote web servers. The memory 1950 can also include user interface instructions 1956, including graphical user interface instructions to facilitate graphic user interface processing.

Additionally, the memory 1950 can store sensor processing instructions 1958 to facilitate sensor-related processing and functions; telephony instructions 1960 to facilitate telephone-related processes and functions; messaging instructions 1962 to facilitate electronic-messaging related processes and functions; web browser instructions 1964 to facilitate web browsing-related processes and functions; media processing instructions 1966 to facilitate media processing-related processes and functions; location services instructions including GPS and/or navigation instructions 1968 and Wi-Fi based location instructions to facilitate location based functionality; camera instructions 1970 to facilitate camera-related processes and functions; and/or other software instructions 1972 to facilitate other processes and functions, e.g., security processes and functions, and processes and functions related to the systems. The memory 1950 may also store other software instructions such as web video instructions to facilitate web video-related processes and functions; and/or web shopping instructions to facilitate web shopping-related processes and functions. In some implementations, the media processing instructions 1966 are divided into audio processing instructions and video processing instructions to facilitate audio processing-related processes and functions and video processing-related processes and functions, respectively. A mobile equipment identifier, such as an International Mobile Equipment Identity (IMEI) 1974 or a similar hardware identifier can also be stored in memory 1950.

Each of the above identified instructions and applications can correspond to a set of instructions for performing one or more functions described above. These instructions need not be implemented as separate software programs, procedures, or modules. The memory 1950 can include additional instructions or fewer instructions. Furthermore, various functions may be implemented in hardware and/or in software, including in one or more signal processing and/or application specific integrated circuits.

Figure 20:
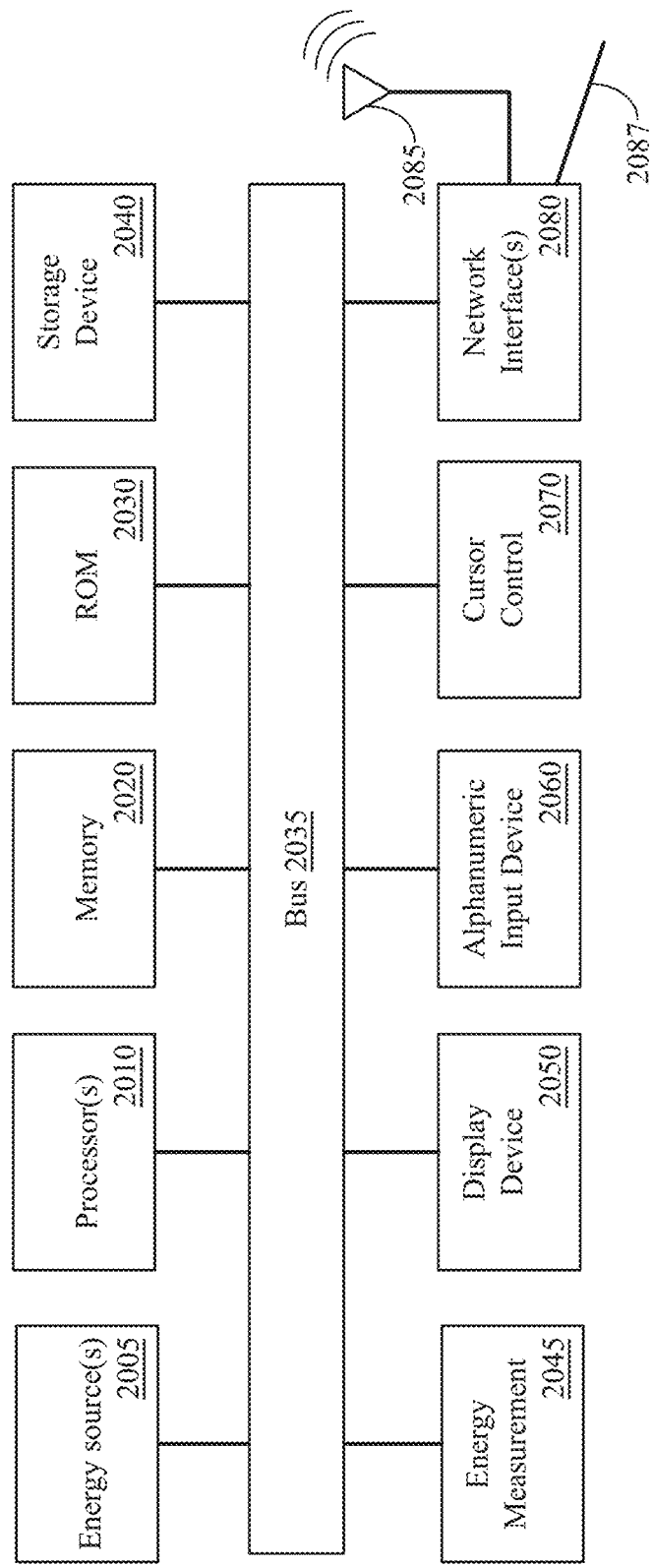
FIG. 20 is a block diagram of one embodiment of a computing system.

FIG. 20 is a block diagram of one embodiment of a computing system 2000. The computing system illustrated in FIG. 20 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 20 may be used to provide the computing device and/or the server device.

Computing system 2000 includes bus 2035 or other communication device to communicate information, and processor(s) 2010 coupled to bus 2035 that may process information.

While computing system 2000 is illustrated with a single processor, computing system 2000 may include multiple processors and/or co-processors 2010. Computing system 2000 further may include random access memory (RAM) or other dynamic storage device (e.g., main memory 2020), coupled to bus 2035 and may store information and instructions that may be executed by processor(s) 2010. Main memory 2020 may also be used to store temporary variables or other intermediate information during execution of instructions by processor(s) 2010.

Computing system 2000 may also include read only memory (ROM) 2030 and/or another data storage device 2040 coupled to bus 2035 that may store information and instructions for processor(s) 2010. Data storage device 2040 may be coupled to bus 2035 to store information and instructions. Data storage device 2040 such as flash memory or a magnetic disk or optical disc and corresponding drive may be coupled to computing system 2000.

Computing system 2000 may also be coupled via bus 2035 to display device 2050 to display information to a user. Computing system 2000 can also include an alphanumeric input device 2060, including alphanumeric and other keys, which may be coupled to bus 2035 to communicate information and command selections to processor(s) 2010. Another type of user input device is cursor control 2070, such as a touchpad, a mouse, a trackball, or cursor direction keys to communicate direction information and command selections to processor(s) 2010 and to control cursor movement on display device 2050. Computing system 2000 may also receive user input from a remote device that is communicatively coupled to computing system 2000 via one or more network interface(s) 2080.

Computing system 2000 further may include one or more network interface(s) 2080 to provide access to a network, such as a local area network. Network interface(s) 2080 may include, for example, a wireless network interface having antenna 2085, which may represent one or more antenna(e). Computing system 2000 can include multiple wireless network interfaces such as a combination of Wi-Fi, Bluetooth®, near field communication (NFC), and/or cellular telephony interfaces. Network interface(s) 2080 may also include, for example, a wired network interface to communicate with remote devices via network cable 2087, which may be, for example, an Ethernet cable, a coaxial cable, a fiber optic cable, a serial cable, or a parallel cable.

In one embodiment, network interface(s) 2080 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 2000 can further include one or more energy sources 2005 and one or more energy measurement systems 2045. Energy sources 2005 can include an AC/DC adapter coupled to an external power source, one or more batteries, one or more charge storage devices, a USB charger, or other energy source. Energy measurement systems include at least one voltage or amperage measuring device that can measure energy consumed by the computing system 2000 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

Other embodiments described herein provide for a satellite device that can be a managed enterprise device associated with a managed enterprise account. Certain information can be synchronized with the satellite device via the association with a group of enterprise accounts. For example, the satellite device can then access calendars, media, or other data that is shared with user accounts within a group of enterprise user accounts. The satellite device can also support enterprise account creation by a management device on behalf of an employee or another enterprise user.

One embodiment provided for a mobile electronic device comprising one or more wireless network interfaces, a camera device, a memory device to store instructions, and one or more processors coupled with the one or more wireless network interfaces, the camera device, and the memory device. The one or more processors are configured to execute instructions stored on the memory device, the instructions to cause the one or more processors to invoke a wireless communications configuration mode for configuring a wearable accessory device via the mobile electronic device, the mobile electronic device to establish a wireless connection with the wearable accessory device via the one or more wireless network interfaces, obtain identifying information for the wearable accessory device via an image captured via the camera, establish the wireless connection with the wearable accessory device via the one or more wireless network interfaces based on the identifying information obtained via the image captured via the camera, and configure the wearable accessory device for use with a first account, wherein the first account differs from a second account on the mobile electronic device.

One embodiment provides for a method implemented on an electronic device, the method comprising receiving a request to associate a first account in a family of accounts with a satellite accessory device, wherein the satellite accessory device is a wearable electronic device configured for operation without a paired companion device and the satellite accessory device is to be at least partially managed by a management device associated with a second account in the family of accounts, determining that the first account has associated data stored within an online server and the first account is associated with an electronic device other than the satellite accessory device, sending a request to the electronic device to display a prompt requesting approval to enable management of the associated data by the second account, and enabling management of data associated with the first account by the second account in response to receipt of approval from the electronic device.

One embodiment provides a non-transitory machine-readable medium storing instructions to cause one or more processors of an electronic device to perform operations comprising establishing a wireless data connection between the electronic device and a wireless accessory, displaying a prompt for authentication credentials associated with a first account, wherein the first account is to be associated with the wireless accessory and the first account differs from a second account, the second account associated with the electronic device, transmitting authentication credentials for the first account to a first server, receiving an authentication response from the first server, wherein the authentication response indicates that the wireless accessory is trusted by the first server, and sending credentials to the wireless accessory to enable the wireless accessory to authenticate with a second server using the first account.

One embodiment provides an electronic device comprising a first wireless network interface, a second wireless network interface, a touch-screen display, and one or more processors to execute instructions stored in memory. The instructions to cause the one or more processors to establish a first data connection with an external electronic device via the first wireless network interface, display, via the touch-screen display, a prompt to request input of a passcode for the electronic device, store a received passcode within memory of the electronic device, and receive, via the first data connection, credentials for an account to associate with the electronic device, the credentials received via a user interface presented on the external electronic device. The one or more processors can additionally establish a second data connection with a server device via the second wireless network interface, authenticate with the server device via the credentials for the account, and after authentication with the server device via the credentials for the account, configure the electronic device to authenticate with the server device via the passcode stored within the memory of the electronic device.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device comprising:
a memory; and
one or more processors communicatively coupled to the memory and configured to execute instructions stored in the memory for performing operations of:
establishing a wireless data connection between the electronic device and a wireless accessory;
displaying a prompt for authentication credentials associated with a first account, wherein the first account is to be associated with the wireless accessory and the first account differs from a second account, the second account associated with the electronic device;
transmitting authentication credentials for the first account to a first server;
receiving an authentication response from the first server, wherein the authentication response indicates that the wireless accessory is trusted by the first server; and
sending the authentication credentials to the wireless accessory to configure the wireless accessory to authenticate with a second server using the first account.

2. The electronic device of claim 1, wherein the one or more processors are configured to execute instructions for performing operations of:
requesting the first server to create the first account; and
after requesting the first server to create the first account, displaying the prompt for the authentication credentials associated with the first account, wherein the prompt is included within a remote user interface provided by the first server for display on the electronic device.

3. The electronic device of claim 1, wherein the first account and the second account are accounts within a family or group of associated accounts.

4. The electronic device of claim 1, wherein the one or more processors are configured to execute instructions for performing an operation of accessing a remote calendar database that is at least partially shared between the first account and the second account.

5. The electronic device of claim 1, wherein the wireless accessory includes a heart monitor, health sensor, or glucose monitor.

6. The electronic device of claim 1, wherein the wireless accessory is a wearable device.

7. The electronic device as in claim 6, wherein the wearable device includes one or more of a GPS tracker, fitness tracker, virtual reality or augmented reality head mounted display, jewelry, shoes, clothes, or other wearable item.

8. An electronic device comprising:
a memory; and
one or more processors communicatively coupled to the memory and configured to execute instructions stored in the memory for performing operations of:
  establishing a wireless data connection between the electronic device to be associated with a first account and a second device associated with a second account, wherein the first account differs from the second account;
  transmitting data from the electronic device to the second device, the data configured for verification by the second device identifying information for the electronic device;
  receiving, from the second device in response to the data, credentials for the electronic device, the credentials indicating trust of the electronic device by a first server; and
  authenticating the electronic device with a second server using the first account.

9. The electronic device of claim 8, wherein the one or more processors are configured to execute instructions for performing an operation of deriving a cryptographic secret via a passcode, the cryptographic secret configured for the authenticating of the electronic device with the second server.

10. The electronic device of claim 8, wherein the first account and the second account are accounts within a family or group of associated accounts.

11. The electronic device of claim 8, wherein the one or more processors are configured to execute instructions for performing an operation of accessing a remote calendar database that is at least partially shared between the first account and the second account.

12. The electronic device of claim 8, further comprising a heart monitor, health sensor, or glucose monitor.

13. The electronic device of claim 8, further comprising one or more of a GPS tracker, fitness tracker, or virtual reality or augmented reality head mounted display.

14. A method comprising:
  establishing a wireless data connection between a wireless accessory to be associated with a first account and an electronic device associated with a second account, wherein the first account differs from the second account;
  transmitting data from the wireless accessory to the electronic device, the data configured for verification by the electronic device identifying information for the wireless accessory;
  receiving, from the electronic device in response to the data, credentials for the wireless accessory, the credentials indicating trust of the wireless accessory by a first server; and
  authenticating the wireless accessory with a second server using the first account.

15. The method of claim 14, further comprising deriving a cryptographic secret via a passcode, the cryptographic secret configured for the authenticating of the wireless accessory with the second server.

16. The method of claim 14, wherein the first account and the second account are accounts within a family or group of associated accounts.

17. The method of claim 14, further comprising accessing a remote calendar database that is at least partially shared between the first account and the second account.

18. The method of claim 14, wherein the wireless accessory includes a heart monitor, health sensor, or glucose monitor.

19. The method of claim 14, wherein the wireless accessory includes one or more of a GPS tracker, fitness tracker, or virtual reality or augmented reality head mounted display.

20. The method of claim 14, wherein the wireless accessory is an audio device.

21. A non-transitory machine-readable medium storing instructions to cause one or more processors of an electronic device to perform operations comprising:
  establishing, by an application program, a wireless data connection between the electronic device and a wireless accessory;
  causing a prompt to be displayed for authentication credentials associated with a first account for the application program, wherein the first account is to be associated with the wireless accessory and the first account differs from a second account associated with the application program, the second account associated with the electronic device;
  transmitting, by the application program, authentication credentials for the first account to a first server;
  receiving, by the application program, an authentication response from the first server, wherein the authentication response indicates that the wireless accessory is trusted by the first server; and
  sending, by the application program, the authentication credentials to the wireless accessory to configure the wireless accessory to authenticate with a second server using the first account.

22. The non-transitory machine-readable medium of claim 21, the operations additionally comprising:
  requesting the first server to create the first account; and
  after requesting the first server to create the first account, causing the prompt to be displayed for the authentication credentials associated with the first account, wherein the prompt is included within a remote user interface provided by the first server for display by the application program on the electronic device.

23. The non-transitory machine-readable medium of claim 21, wherein the first account and the second account are accounts within a family or group of associated accounts associated with the application program.

24. The non-transitory machine-readable medium of claim 21, the operations additionally comprising accessing a remote database associated with the application program, the remote database at least partially shared between the first account and the second account.

* * * * *